United States Patent
Toishi et al.

(10) Patent No.: US 7,502,151 B2
(45) Date of Patent: Mar. 10, 2009

(54) HOLOGRAPHIC RECORDING AND RECONSTRUCTING APPARATUS AND METHOD

(75) Inventors: Mitsuru Toishi, Tokyo (JP); Tomiji Tanaka, Saitama (JP); Mikio Sugiki, Kanagawa (JP)

(73) Assignee: Sony Corporation (JP)

( * ) Notice: Subject to any disclaimer, the term of this patent is extended or adjusted under 35 U.S.C. 154(b) by 208 days.

(21) Appl. No.: 11/388,473

(22) Filed: Mar. 24, 2006

(65) Prior Publication Data

US 2006/0232841 A1    Oct. 19, 2006

(30) Foreign Application Priority Data

Mar. 24, 2005    (JP) .............................. 2005-085666

(51) Int. Cl.
*G03H 1/02* (2006.01)
(52) U.S. Cl. .................................. 359/3; 359/35; 430/1
(58) Field of Classification Search .................... 359/3; 430/351
See application file for complete search history.

(56) References Cited

U.S. PATENT DOCUMENTS 5,672,448 A * 9/1997 Isogai et al. ................... 430/1
6,650,447 B2 * 11/2003 Curtis et al. ................... 359/3

FOREIGN PATENT DOCUMENTS

JP    11-242424 A    9/1999

* cited by examiner

*Primary Examiner*—Audrey Y Chang
(74) *Attorney, Agent, or Firm*—Lerner, David, Littenberg, Krumholz & Mentlik, LLP

(57) ABSTRACT

A holographic recording and reconstructing apparatus includes a light source having a variable oscillation wavelength; a temperature sensing unit operable to sense temperature; and a control unit operable to record information about a temperature sensed by the temperature sensing unit on a holographic recording medium during recording, to obtain the information about the temperature from the holographic recording medium and obtain a temperature sensed by the temperature sensing unit during reconstruction, to determine the amount of wavelength shift to counteract the effects of a change in the dimension of the holographic recording medium between recording and reconstruction based on the difference between the temperatures, and to shift the oscillation wavelength of the light source by the determined amount.

11 Claims, 15 Drawing Sheets

SHIFT DIRECTION

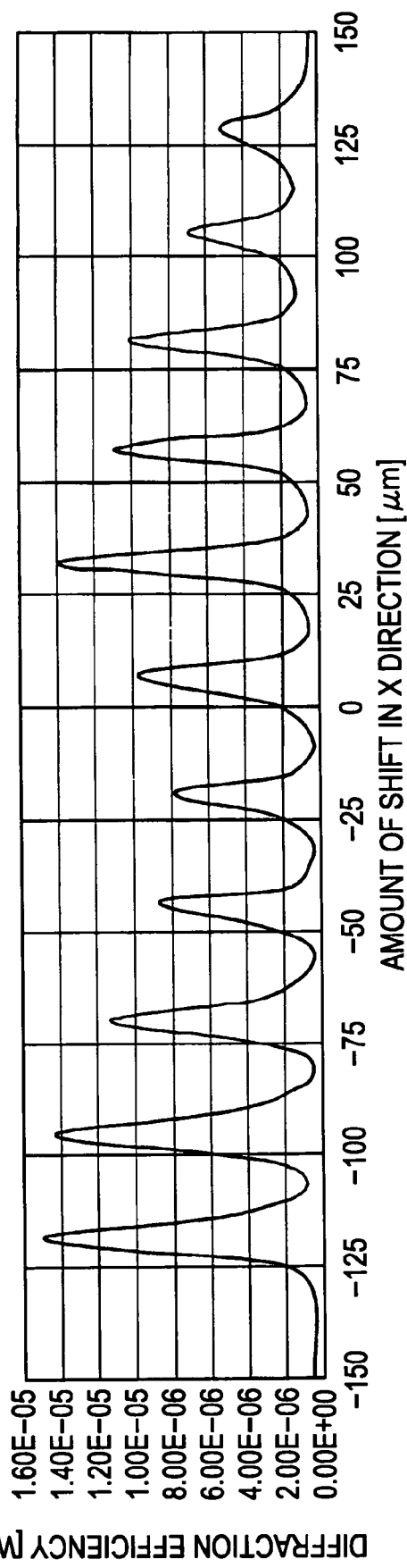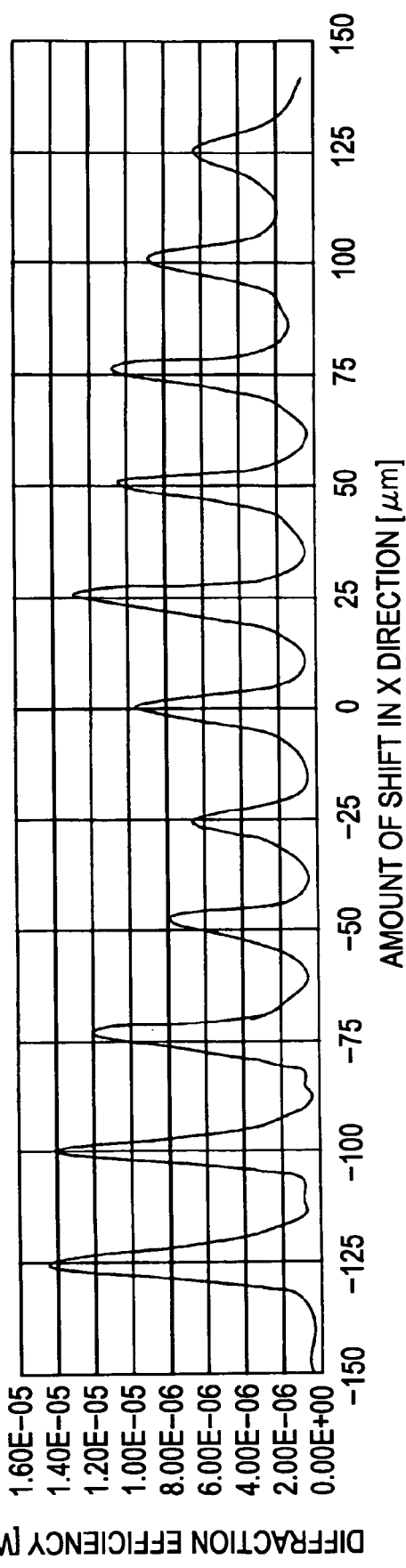

— BEFORE SHRINKAGE
······ AFTER SHRINKAGE

HOLOGRAPHIC RECORDING AND RECONSTRUCTING APPARATUS AND METHOD

CROSS-REFERENCE

The present application claims priority from Japanese Patent Application No. JP 2005-085666 filed on Mar. 24, 2005, the disclosure of which is hereby incorporated by reference herein.

BACKGROUND OF THE INVENTION

The present invention relates to a holographic recording and reconstructing apparatus and method for recording and reconstructing holograms as data.

The development of holographic recording apparatuses for recording data using holography is advancing.

In the holographic recording apparatus, one laser beam is divided into two beams, i.e., a signal beam that is modulated (data-superimposed) and a reference beam that is unmodulated. Those beams are applied to the same position in a holographic recording medium. Consequently, the signal beam interferes with the reference beam on the holographic recording medium to form a diffraction grating (hologram) in the beam-irradiated position, thus recording data on the holographic recording medium.

When the reference beam is applied to the recorded medium, a diffracted beam (reconstructed beam) is generated from the diffraction grating formed during recording. The reconstructed beam includes data superimposed on the signal beam during recording. A photodetector receives the reconstructed beam to output signals corresponding to the recorded data, so that the data can be read.

In some cases, in order to record many pieces of information on a holographic recording medium, many holograms are formed on the holographic recording medium. In this case, holograms are not always formed in different positions on the holographic recording medium. Holograms can be formed in the same position (alternatively, overlapping areas) on the holographic recording medium. This is called multiplexed recording. There are various multiplexing methods for holographic recording, e.g., angular multiplexing, wavelength multiplexing, rotation multiplexing, and shift multiplexing.

For example, in the angular multiplexing method, the incident angle of a reference beam is being shifted every recording, so that holograms are formed in the same position in a holographic recording medium using the reference beams with shifted incident angles. A reconstructed beam corresponding to each hologram formed in the same position, i.e., data can be obtained by using the corresponding reference beam that is the same as that used during recording.

In the shift multiplexing method, holograms are recorded on a holographic recording medium while a beam irradiated position is being shifted (in the lateral direction) by a distance smaller than the size of a hologram pattern formed on the holographic recording medium.

In a coaxial holographic method, a signal beam pattern and a reference beam pattern are coaxially arranged such that the reference beam pattern surrounds the signal beam pattern, so that the signal beam interferes with the reference beam in all directions to record a hologram.

The development of holographic recording apparatuses using phase correlation multiplexing, a kind of multiplexed recording methods, is advancing. Those apparatuses intend to increase the storage capacity of a holographic recording medium. Japanese Unexamined Patent Application Publication No. 11-242424 discloses an example of this kind of apparatus.

As holographic recording media, attention is being paid to photopolymer media because the manufacturing cost is low, the durability is high, and the sensitivity is high. However, such a photopolymer holographic recording medium has a phenomenon in which the angle or spacing of a diffraction grating varies due to a change in the dimension of the medium, such as the shrinkage on polymerization during recording or the shrinkage or expansion of the polymer with temperature change. The variation in the geometry of the diffraction grating leads to the deviation of an angle for peak diffraction efficiency during reconstruction from that during recording. The reliability of reconstruction may be reduced.

In the angular multiplexing method, one approach to solving the above-described problem is to shift the angle of the grating during reconstruction so as to obtain the peak diffraction efficiency. However, shifting the angle thereof during reconstruction from that during recording complicates recording and reconstruction processes.

In the shift multiplexing method, similarly, the variation in the geometry of the diffraction grating causes the deviation of a position for peak diffraction efficiency during reconstruction from that during recording. In this case, one approach to correcting the deviation is to shift the position during reconstruction so as to obtain the peak diffraction efficiency in a manner similar to the above approach for the angular multiplexing method. Assuming the use of a medium providing grooves indicative of recording positions, e.g., an optical disk, such as a DVD, after recording based on a predetermined groove pitch, a groove pitch to obtain the peak diffraction efficiency during reconstruction is deviated from that during recording. Disadvantageously, it results in complicated access during reconstruction.

In consideration of the above-described disadvantages, it is desirable to provide a holographic recording and reconstructing apparatus and method capable of counteracting the effects of a change in the dimension of a holographic recording medium on reconstruction, the change being caused by temperature change.

SUMMARY OF THE INVENTION

According to an embodiment of the present invention, there is provided a holographic recording and reconstructing apparatus including a light source having a variable oscillation wavelength; a temperature sensing unit operable to sense temperature; and a control unit operable to record information about temperature sensed by the temperature sensing unit on a holographic recording medium during recording, to obtain the information about the temperature from the holographic recording medium and obtain a temperature sensed by the temperature sensing unit during reconstruction, to determine the amount of wavelength shift to counteract the effects of a change in the dimension of the holographic recording medium between recording and reconstruction based on the difference between the temperatures, and to shift the oscillation wavelength of the light source by the determined amount.

According to the embodiment of the present invention, a reconstruction wavelength is shifted from a recording wavelength, thus counteracting the effects of a change in the dimension of the holographic recording medium caused by a temperature change. Advantageously, the recording and reconstructing processes are not complicated.

In the holographic recording and reconstructing apparatus according to this embodiment, the control unit may obtain information about the thermal expansion coefficient of the holographic recording medium to calculate the amount of wavelength shift using the thermal expansion coefficient. The information about the thermal expansion coefficient is previously recorded on the holographic recording medium.

Since the amount of wavelength shift is calculated using the thermal expansion coefficient of the holographic recording medium in addition to the temperature difference between recording and reconstruction, the amount of wavelength shift to counteract the effects of a change in the dimension of the holographic recording medium caused by temperature change can be obtained with higher accuracy.

In addition, in the holographic recording and reconstructing apparatus according to this embodiment, when the difference between the temperatures is below a threshold value, the control unit may determine the amount of wavelength shift in consideration of the shrinkage of the holographic recording medium during recording to shift the oscillation wavelength of the light source by the determined amount.

When the thermal expansion of the holographic recording medium is small enough not to affect reconstruction, independently of the temperature difference, a wavelength is shifted to compensate for the shrinkage on polymerization of the medium during recording, thus counteracting the effects of a change in the dimension of the holographic recording medium on reconstruction.

In this instance, the control unit may obtain information about the shrinkage of the holographic recording medium during recording to calculate the amount of wavelength shift using the shrinkage. The information about the shrinkage is previously recorded as header information on the holographic recording medium. Thus, the amount of wavelength shift can be obtained with higher accuracy.

In the holographic recording and reconstructing apparatus according to this embodiment, the control unit may determine the amount of wavelength shift in consideration of the angle of incidence of a beam on the holographic recording medium.

Since the amount of wavelength shift depends on the incident angle of a beam, information about the incident angle may be added to header information. The amount of wavelength shift is calculated in consideration of the incident angle of the beam, thus obtaining a more appropriate amount of wavelength shift.

Further, in the holographic recording and reconstructing apparatus according to this embodiment, the control unit may divide the whole area of the holographic recording medium into sections, record information about temperature sensed by the temperature sensing unit every section during recording, and determine the amount of wavelength shift every section during reconstruction.

Therefore, even when temperatures vary from position to position in the holographic recording medium, the amount of wavelength shift to counteract the effects of a change in the dimension of the holographic recording medium between recording and reconstruction can be obtained every section with higher accuracy. Thus, compensation can be achieved with higher accuracy.

In addition, in the holographic recording and reconstructing apparatus according to this embodiment, the control unit may divide one image into segments and control so as to reconstruct the segments with different wavelengths.

Accordingly, even when an image cannot be simultaneously reconstructed due to a large change in temperature, a reconstructed image can be obtained with uniform high contrast.

Further, in the holographic recording and reconstructing apparatus according to this embodiment, the control unit may obtain the number of segments and the wavelengths for the segments based on the difference between the temperatures.

According to this embodiment of the present invention, the holographic recording and reconstructing apparatus may further include a function CMOS sensor capable of receiving image signals corresponding to a reconstructed image to read the image signal in a designated address. When one image is divided into segments and the segments are reconstructed with different wavelengths, the control unit may control to read the image signals corresponding to each segment from the function CMOS sensor synchronously with a change in wavelength. Consequently, a reconstructed image can be read with high efficiency.

According to another embodiment of the present invention, there is provided a holographic recording and reconstructing method including recording information about temperature sensed by temperature sensing means on a holographic recording medium during recording; obtaining the information about the temperature from the holographic recording medium and obtaining a temperature sensed by the temperature sensing means during reconstruction; and determining the amount of wavelength shift to counteract the effects of a change in the dimension of the holographic recording medium between recording and reconstruction based on the difference between the temperatures.

As mentioned above, in the holographic recording and reconstructing apparatus and method according to the embodiments of the present invention, the effects of a change in the dimension of a holographic recording medium on holographic reconstruction can be overcome, the change being caused by a temperature change.

BRIEF DESCRIPTION OF THE DRAWINGS

FIGS. 12A and 12B are graphs each showing the measurement of diffraction efficiencies of a holographic recording medium in which multiplexed recording has been performed by the shift multiplexing method, FIG. 12A showing a reconstruction using the same wavelength as that during recording, FIG. 12B showing a reconstruction using a wavelength different from that during recording;

DETAILED DESCRIPTION

An embodiment of the present invention will now be described with reference to the drawings.

Effects of Change in Geometry of Diffraction Grating

Figure 1:
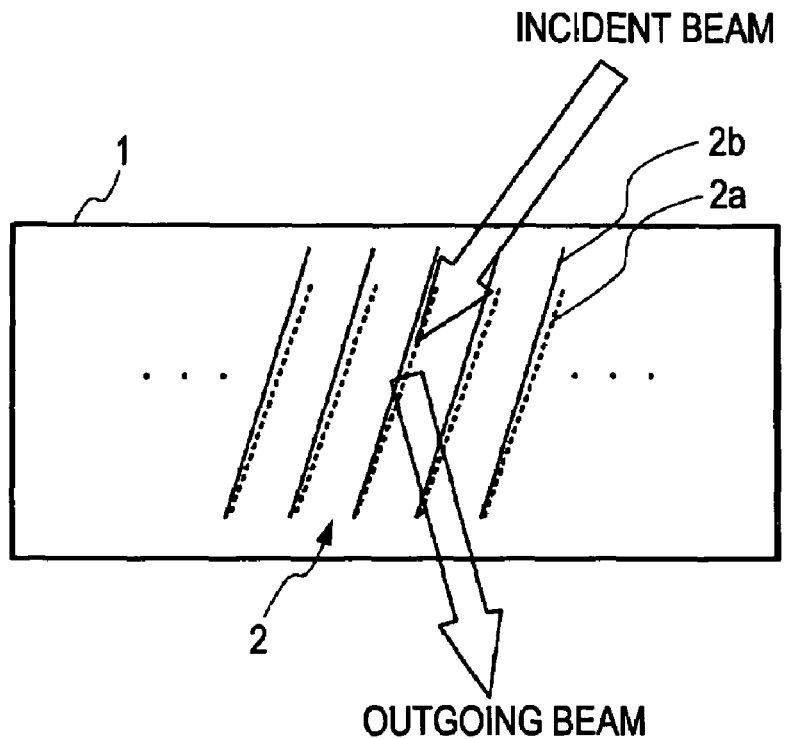
FIG. 1 is a diagram showing a change in the geometry of a diffraction grating caused by a change in the dimension of a holographic recording medium.
Figure 2:
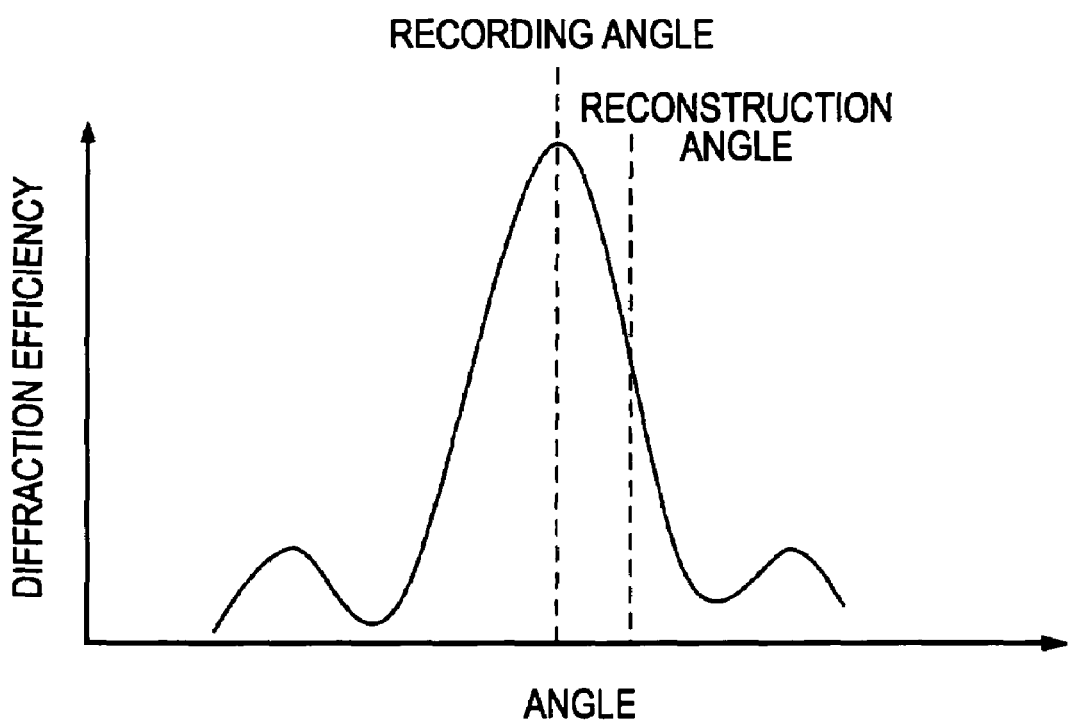
FIG. 2 is a graph showing the difference in angle for peak diffraction efficiency between recording and reconstruction when the geometry of a diffraction grating is changed.

Referring to FIG. 1, in a photopolymer holographic recording medium 1, the angle or spacing of a diffraction grating 2 varies due to a change in the dimension of the recording medium 1, such as the shrinkage on polymerization during recording or the shrinkage or expansion of the polymer with temperature change. Referring to FIG. 1, the medium 1 has a diffraction grating 2a before shrinkage. After the shrinkage, the medium 1 has a diffraction grating 2b. Due to a change in the geometry of the diffraction grating 2, as shown in FIG. 2, the angle for peak diffraction efficiency during reconstruction is shifted from that during recording.

Figure 3:
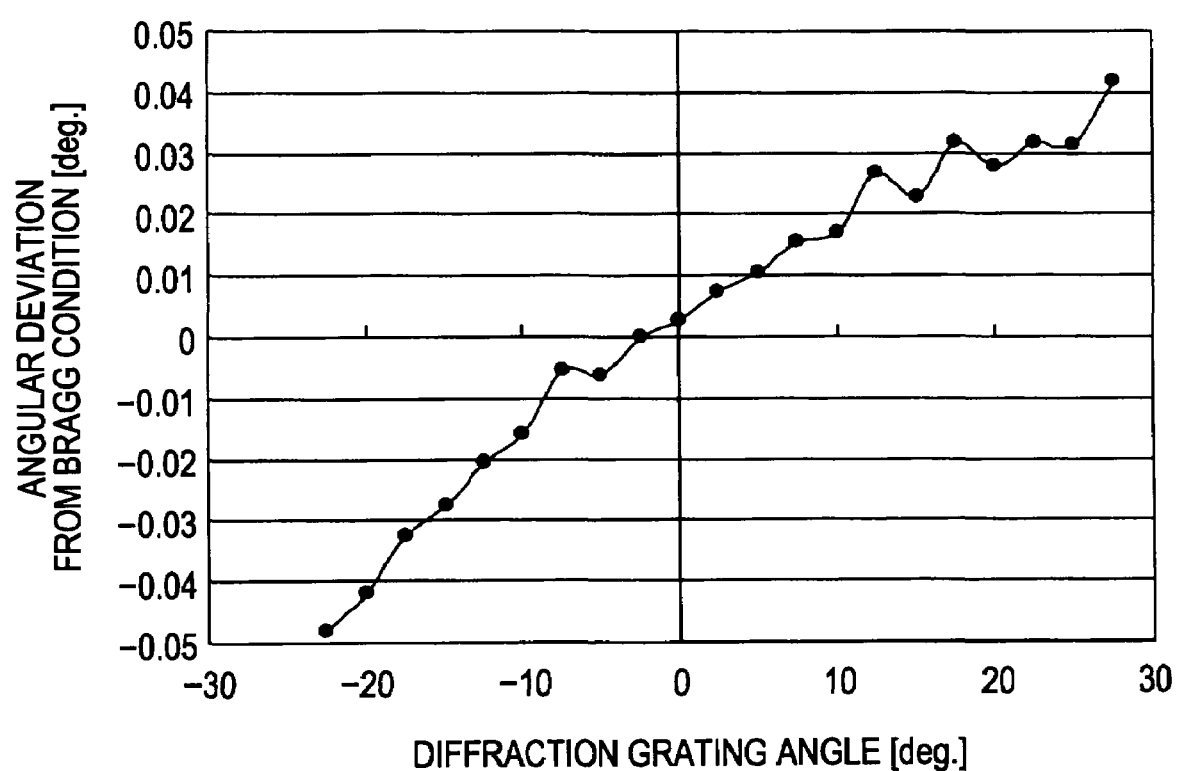
FIG. 3 is a graph showing a relationship between the angle of a diffraction grating and the angular deviation from the Bragg condition (i.e., the deviation of an angle, at which a diffracted beam is generated, from the angle at which the Bragg condition is satisfied)

FIG. 3 is a graph showing a relationship between the angle of a diffraction grating and the deviation of an angle, at which a diffracted beam is generated, from the angle at which the Bragg condition is satisfied. Hereinafter, this deviation will also be referred to as the angular deviation from the Bragg condition. This graph shows that the angular selective peak position of a diffracted beam depends on the diffraction grating angle.

Figure 4:
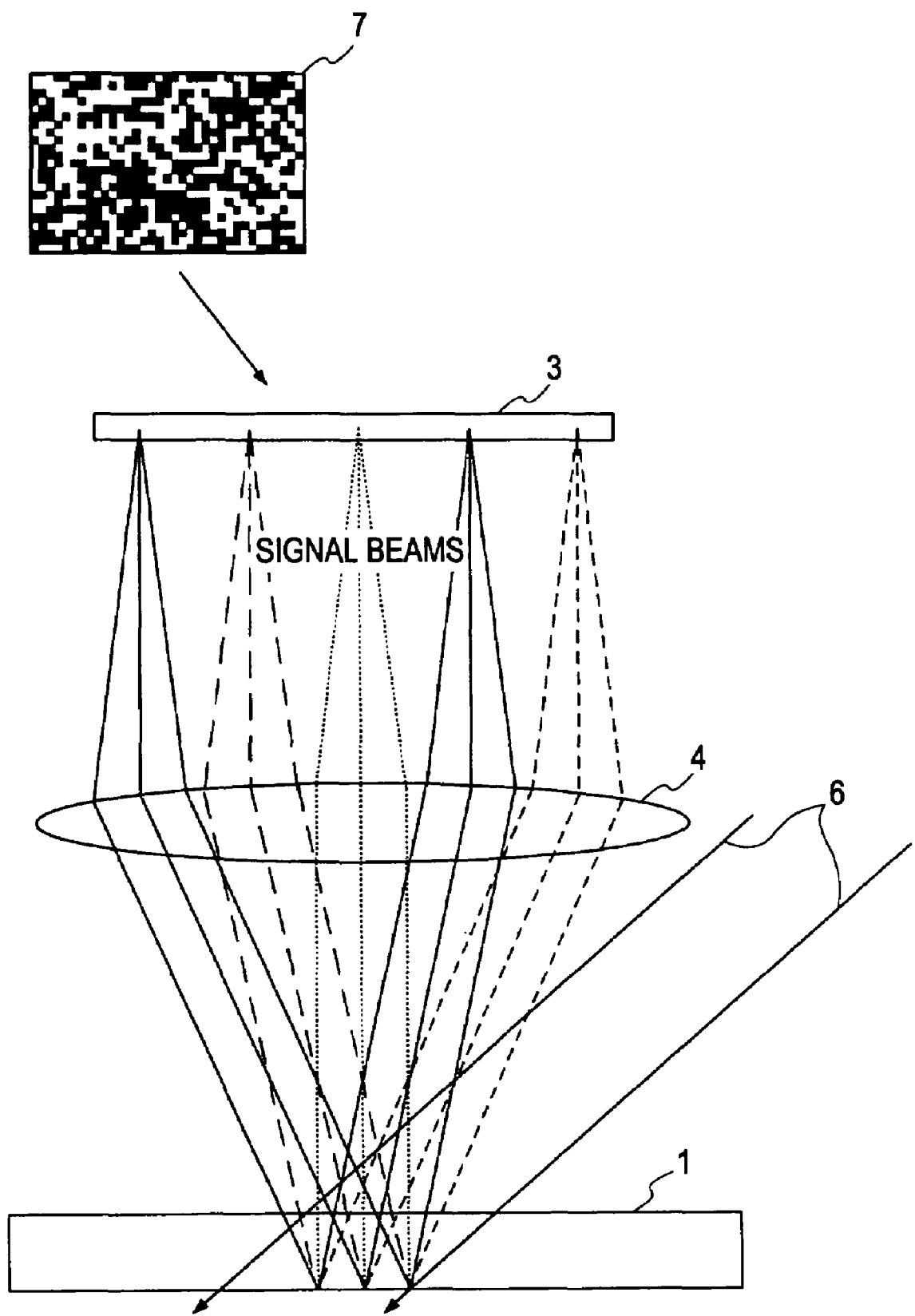
FIG. 4 is a diagram showing an optical system for applying a beam modulated through a spatial light modulator to a holographic recording medium.

FIG. 4 shows an optical system for applying beams modulated by a spatial light modulator to a holographic recording medium. Referring to FIG. 4, a spatial light modulator 3 superimposes two-dimensional pattern information 7 on a beam to produce a signal beam 5 and emits the signal beam 5. The signal beam 5 emitted from the spatial light modulator 3 is applied to the holographic recording medium 1 through a lens 4. In this instance, a reference beam 6 is applied to substantially the same position as the position irradiated with the signal beam 5 on the holographic recording medium 1. Interference occurs between the reference beam 6 and the signal beam 5, thus recording a hologram on the holographic recording medium 1.

Note that the tracks of the respective signal beams 5 emitted from respective positions in the spatial light modulator 3. It will be understood that the diffracting grating angle (basically, the angle of the bisector of the reference beam and the signal beam) varies every position in the spatial light modulator 3. In other words, the angular deviation from the Bragg condition after a change in the dimension of the medium (e.g., the shrinkage) varies every position in the spatial light modulator 3, so that an image is not uniformly (simultaneously) output.

Effects in Wavelength Shifting

Figure 5:
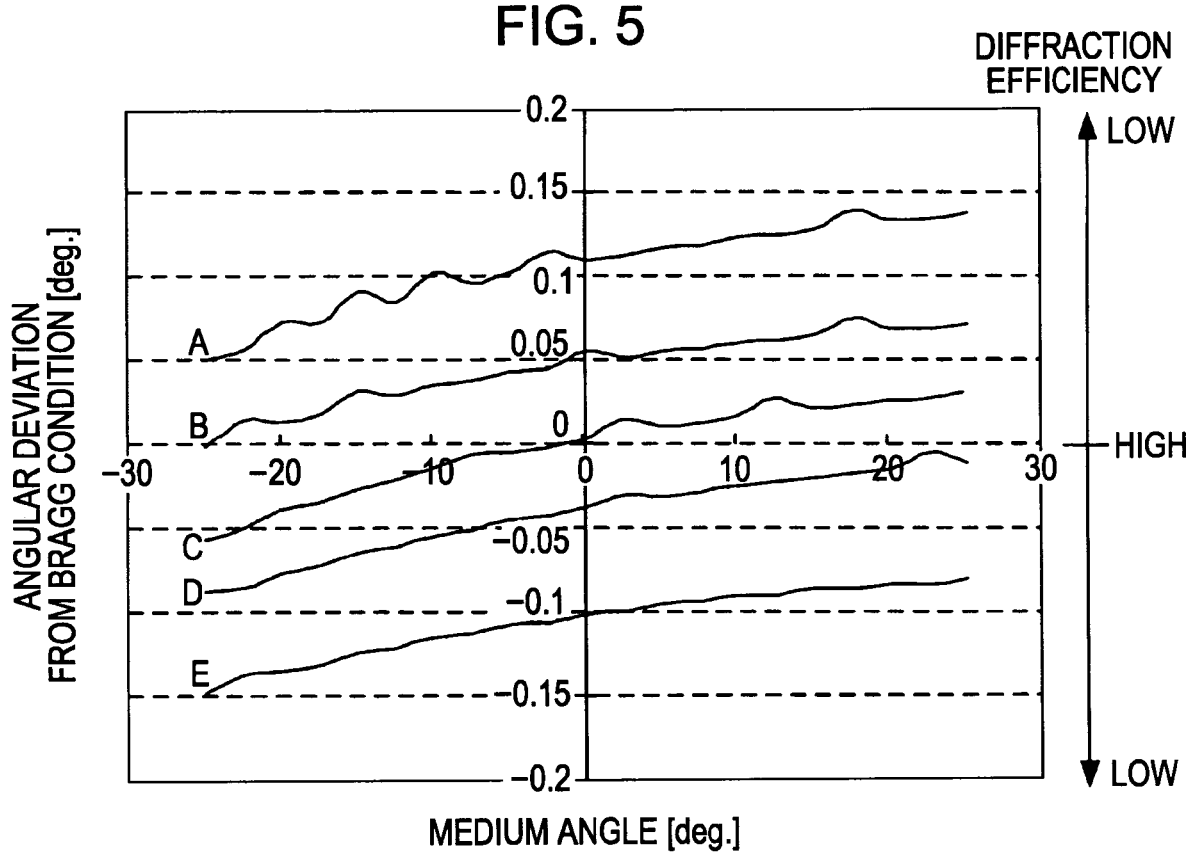
FIG. 5 is a graph showing relationships between the angles of a medium for respective wavelengths and the angular deviations from the Bragg condition.
Figure 6:
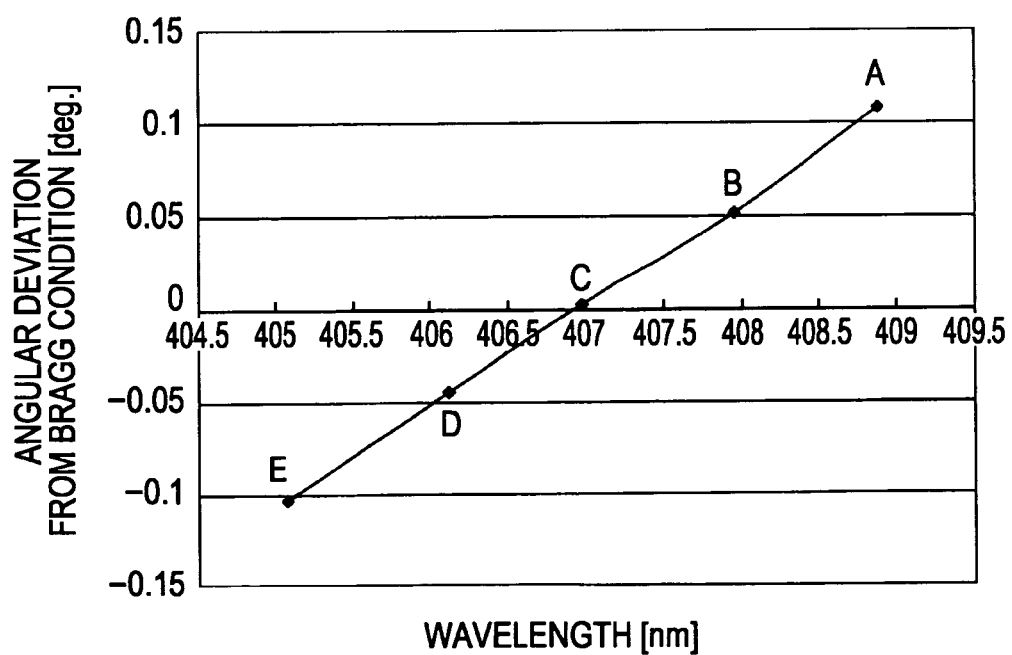
FIG. 6 is a graph showing a relationship between respective wavelengths of FIG. 5 and the angular deviations from the Bragg condition.

FIG. 5 is a graph showing relationships between the angles of a medium for respective wavelengths and the angular deviations from the Bragg condition. FIG. 6 is a graph showing a relationship between respective wavelengths of FIG. 5 and the angular deviations from the Bragg condition. In FIGS. 5 and 6, in case C, a wavelength for recording is the same as that for reconstruction. Case C will be referred to as case using the center wavelength. As the wavelength is shifted from C to B, further to A such that the wavelength becomes longer, the angle at which the angular selective peak of a diffracted beam appears is deviated to the positive angles. On the contrary, when the wavelength is shifted from C to D, further to E such that the wavelength becomes shorter, the angle at which the angular selective peak appears is deviated to the negative angles. As mentioned above, during reconstruction using the center wavelength, the peak diffraction efficiency is obtained at the center angle. As an angle is deviated from the center angle, the diffraction efficiency is reduced. In a reconstructed beam (image), therefore, the contrast is highest at the center of the image. As a position is closer to the edge of the image, the contrast becomes lower.

The difference in contrast between the center of the image and the edges primarily depends on the numerical aperture (NA) of a lens. If the angular deviations from the Bragg condition are equivalent, the diffraction efficiency for each angular deviation primarily depends on the thickness of a holographic recording medium. Generally, the angular deviation $\Delta\theta$, deviated from the angle at which the Bragg condition is satisfied, where the diffraction efficiency is up to 0%, is given by the following expression.

$$\Delta\theta = \frac{\lambda}{2nL\sin\theta_B} \quad \text{[Expression 1]}$$

In the above expression, let L be the thickness of a holographic recording medium, let n be the refractive index thereof, let $\theta_B$ be the angle at which the Bragg condition is satisfied, and let $\lambda$ denote the wavelength.

In this instance, if a value (i.e., angular deviation from the angle at which the Bragg condition is satisfied) obtained at each end of a lens falls within the above-mentioned angular range ($\Delta\theta$), there is no problem. Actually, if the diffraction efficiency is approximate to 0, signals are buried in noise. Accordingly, the diffraction efficiency has to be within the range of 70% to 80% of the maximum value. In this case, inevitably, the contrast is reduced, resulting in a decrease in S/N ratio. If a holographic recording medium is too thick, alternatively, when the angular deviation from the Bragg condition is increased by a change in temperature, a value at each end of the lens may exceed the above-described angular range. In this case, a recorded image cannot be simultaneously reconstructed.

Wavelength Scanning Reconstruction

Figure 7:
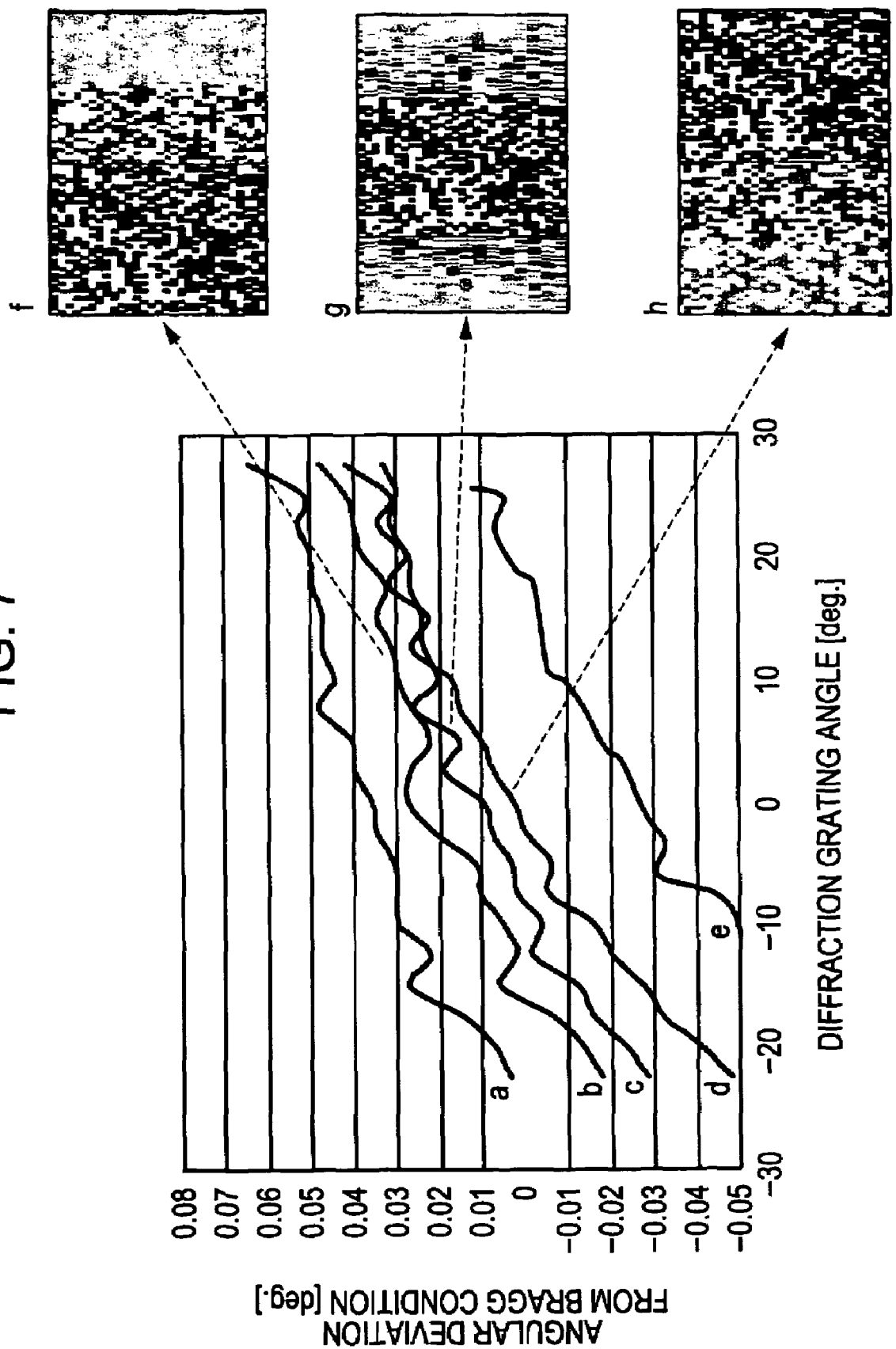
FIG. 7 shows relationships between diffraction grating angles for reconstruction wavelengths and the angular deviations from the Bragg condition and also shows images corresponding to the reconstruction wavelengths.

FIG. 7 shows relationships between diffraction grating angles for reconstruction wavelengths and the angular deviations from the Bragg condition and also shows images corresponding to the reconstruction wavelengths.

Assuming that a holographic recording medium is enough thick and has sharp angular selectivity, in the case of using a center reconstruction wavelength c, an image g is reconstructed such that both ends are defective. When the reconstruction wavelength is shifted to a longer wavelength b, an image f is reconstructed such that a right portion is defective. On the contrary, when the reconstruction wavelength is shifted to a shorter wavelength d, an image h is reconstructed such that a left portion is defective.

Therefore, in the case of using a holographic recording medium having sharp angular selectivity or a lens with a high NA, when an image cannot be simultaneously reconstructed because a change in temperature is large, a recorded image is divided into segments and the segments are reconstructed using different reconstruction wavelengths, so that the entire recorded image can be reconstructed. In other words, in the case of FIG. 7, while the reconstruction wavelength is being sequentially switched between the wavelengths b, c, and d, an image is reconstructed in such a manner that the image is scanned from left to right. This process will be referred to as wavelength scanning reconstruction. Thus, a uniform reconstructed image with high contrast can be obtained.

Function CMOS Sensor

From the viewpoint of efficiency, a function COM sensor is useful to perform the above-described wavelength scanning reconstruction. The function CMOS sensor is capable of designating a read address in order to obtain an image to be reconstructed.

Figure 8:
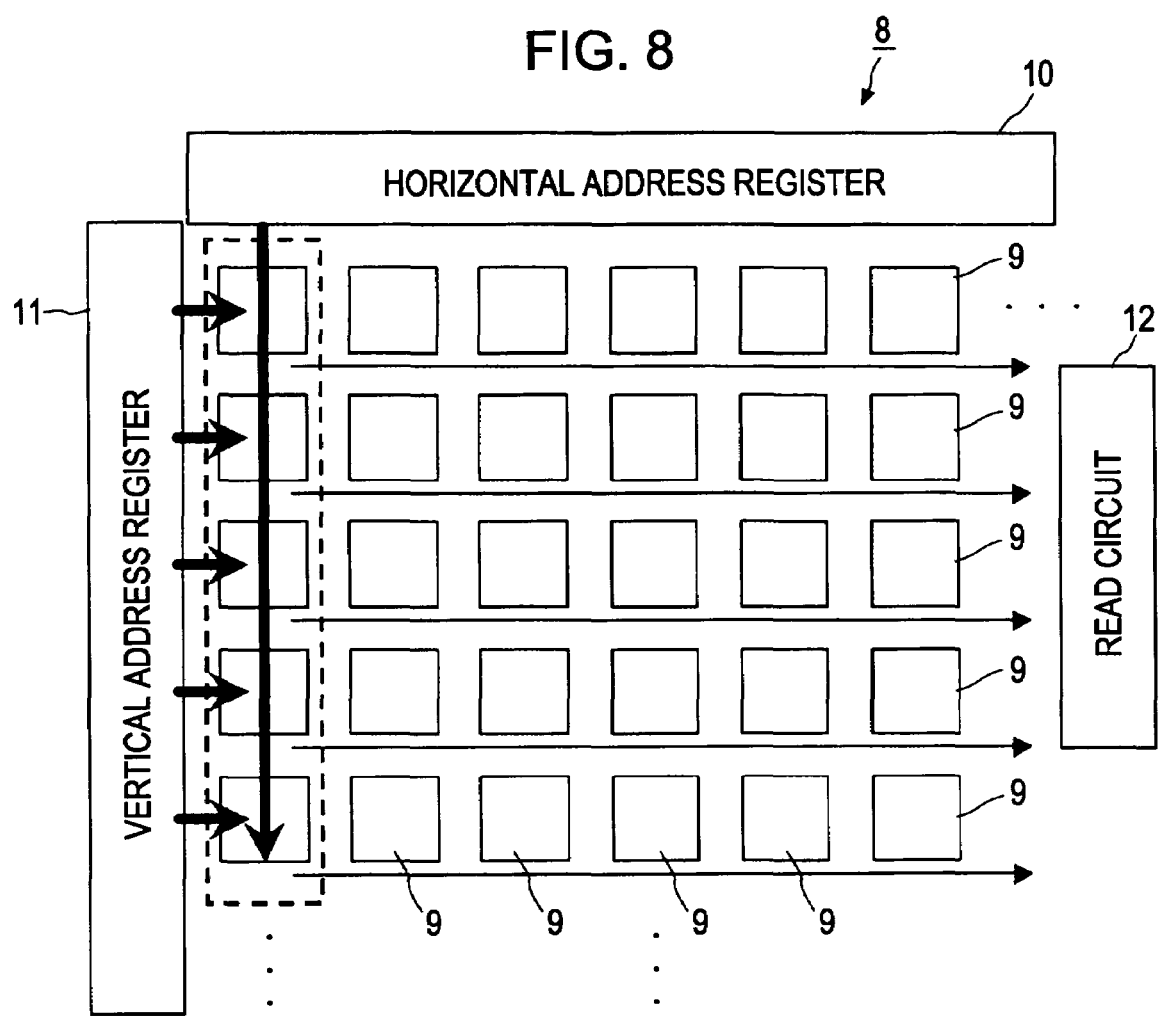
FIG. 8 is a block diagram showing the structure of a function CMOS sensor.

FIG. 8 is a block diagram showing the structure of such a function CMOS sensor. Referring to FIG. 8, a function CMOS sensor 8 includes a two-dimensional array of detectors 9 (hereinbelow, also referred to as a detector array), a horizontal address register 10, a vertical address register 11, and a read circuit 12. The horizontal address register 10 designates a horizontal read address in the detector array 9. The vertical address register 11 designates a vertical read address in the detector array 9. The read circuit 12 reads a signal from the detector 9 designated by the horizontal address register 10 and the vertical address register 11.

The function CMOS sensor can designate an arbitrary address in each of the horizontal and vertical directions to read a signal from the detector corresponding to the designated address. When one image is divided into segments and the segments are reconstructed with different wavelengths, signals corresponding to each segment can be read synchronously with a change in reconstruction wavelength.

Instead of the above-described function CMOS sensor, a high-speed CMOS sensor may be used. In the case of using the high-speed CMOS sensor, while a reconstruction wavelength is being shifted at high speed, an image is captured using respective shifted wavelengths and the captured image is processed, e.g., integrated to reconstruct the entire image.

Header Information

A disk-shaped holographic recording medium has a header information recording area provided in the innermost part thereof. In the header information recording area, information about temperature during recording (hereinbelow, recording temperature information) is recorded as header information. The recording temperature information may be recorded every holographic recording medium. Preferably, the entire area of a disk-shaped holographic recording medium is divided into a plurality of concentric sections and recording temperature information is recorded every section in terms of accuracy.

Information, which is recorded as header information upon manufacturing a disk-shaped holographic recording medium, may include information about the shrinkage on polymerization of the medium during recording and information regarding the thermal expansion coefficient thereof. Since the amount of shift in wavelength depends on the incident angle of a beam, information regarding the incident angle (in the case of a Fourier hologram, information about NA) may be added to header information and the amount of wavelength shift may be calculated on the basis of the information regarding the incident angle.

During reconstruction, the above-described header information is read from the holographic recording medium or every section. The amount of shift in reconstruction wavelength, the number of scanning times for wavelength scanning reconstruction, and wavelengths for respective scans are determined on the basis of the header information and temperature during reconstruction. Then, reconstruction is performed. When the difference in temperature between recording and reconstruction is smaller than a predetermined value (i.e., the thermal expansion of the holographic recording medium 1 is enough small not to affect reconstruction), a wavelength is shifted so as to compensate for the shrinkage on polymerization of the medium during recording.

Initially, certain conditions of a recording medium may be assumed and the amount of wavelength shift, the number of scanning times for wavelength scanning reconstruction, and wavelengths for respective scans may be obtained on the basis of the conditions and be recorded as header information.

Alternatively, the amounts of wavelength shift corresponding to the differences in temperature between recording and reconstruction, the numbers of scanning times for wavelength scanning reconstructions corresponding to the temperature differences, and wavelengths for respective scans may be predetermined. During reconstruction, temperature is continuously sensed. On the basis of the difference between the sensed temperature and holographic recording temperature recorded as header information, a reconstruction wavelength may be dynamically changed.

To sense temperature, a temperature sensor or a method for calculating temperature from a change in refractive index of a holographic recording medium using a servo beam may be used. Any means capable of obtaining information about temperature of a recording medium may be used.

Number of Scanning Times

The number of scanning times for wavelength scanning reconstruction is determined on the basis of the NA of a lens or the sharpness of angular selectivity (primarily depending on the thickness of a holographic recording medium). Therefore, in order to reduce the effects of the inevitable shrinkage of a photopolymer holographic recording medium during recording, it is useful to record information about the NA and that concerning the sharpness as header information.

In this case, the effects of temperature characteristic are not negligible. As temperature rises or falls, a change in the dimension of a holographic recording medium linearly increases. Therefore, a certain temperature and the corresponding thermal expansion coefficient of a holographic recording medium may be measured with respect to the whole area of the holographic recording medium or every section and be recorded as header information on the holographic recording medium. During reconstruction, the optimum number of scanning times can be calculated on the basis of the header information and temperature sensed at that time.

In the case of using the high-speed CMOS sensor as the detector unit, since the whole of an image is captured using reconstruction wavelengths sequentially shifted at high speed and the captured image is integrated to reconstruct one image, it is unnecessary to control the above-described number of scanning times.

Application to Shift Multiplexing Method

Figure 9:
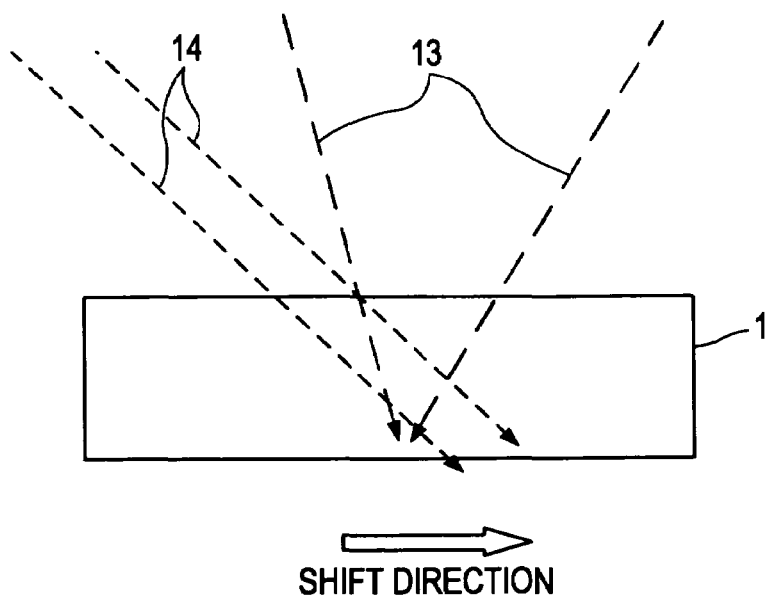
FIG. 9 is a diagram showing the outline of the shift multiplexing method.
Figure 10:
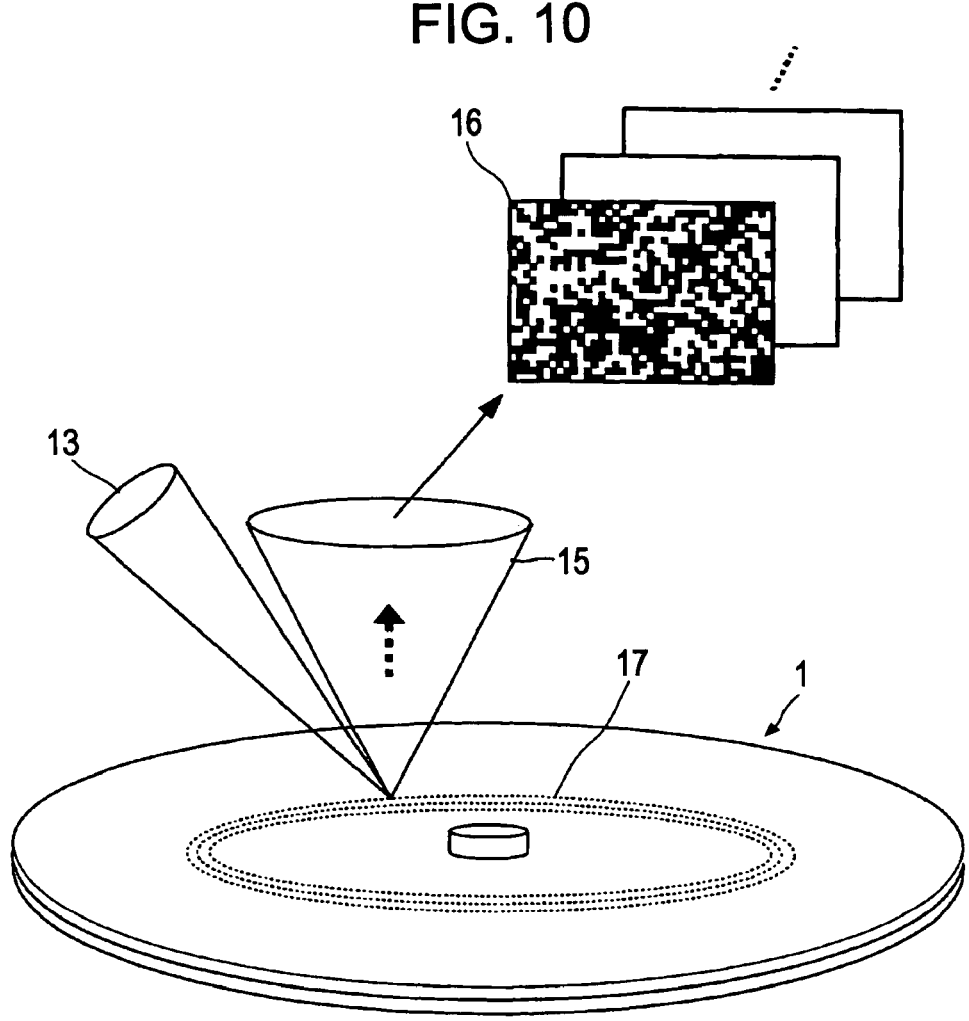
FIG. 10 is a diagram showing the outline of reconstruction in the shift multiplexing method.

FIGS. 9 and 10 are diagrams showing the outline of the shift multiplexing method. In the shift multiplexing method, a converged reference beam is incident on a holographic recording medium. The incident beam is handled as part of a spherical wave. Referring to FIG. 9, in the shift multiplexing method, during recording, a reference beam 13, serving as the above-mentioned spherical wave, interferes with a beam (signal beam) 14 on which two-dimensional pattern information is superimposed, thus recording a hologram on the holographic recording medium 1. Referring to FIG. 10, only the reference beam 13 is applied to the holographic recording medium 1 during reconstruction, so that a diffracted beam (reconstructed beam) 15 having two-dimensional pattern information 16 is obtained from the hologram recorded on the holographic recording medium 1. When a position irradiated with the reference beam 13 is shifted from the position where the hologram is recorded in the direction parallel to the incidence planes of two light waves, i.e., the reference beam 13 and the signal beam 14 (i.e., in the direction along a track 17 of the disk 1), the shift is equivalent to a change in incident angle of the reference beam 13 relative to the hologram. Consequently, the diffracted beam 15 cannot be obtained by the amount of shift smaller than the hologram size. Therefore, the use of spherical wave as the reference beam 13 achieves holographic recording with a very fine pitch, thus increasing the number of multiplexing times.

In the shift multiplexing method, holograms can be recorded in a multiplexing manner by rotating a holographic recording medium. Accordingly, there are many advantages. For example, an optical system can be simplified. In addition, since an optical system similar to the current optical disk drive optical systems for widely diffused CDs and DVDs can be used, the existing servo technology can be utilized.

Figure 11:
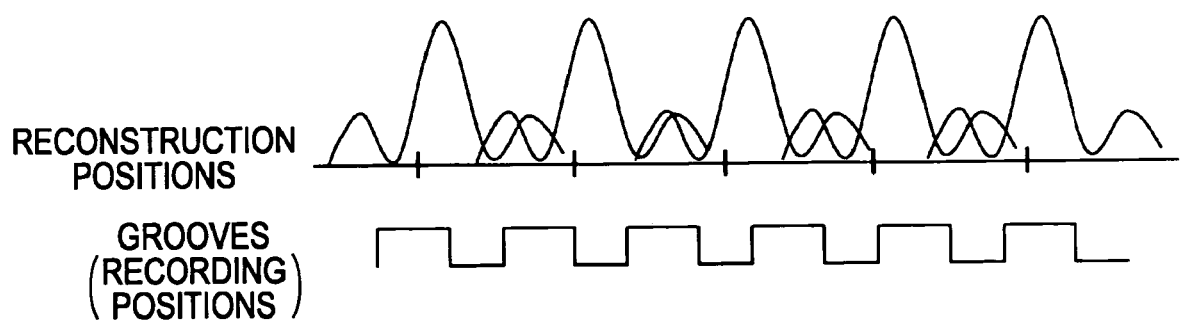
FIG. 11 is a diagram showing the deviation between recording positions (grooves) and reconstruction positions, the deviation being caused by a change in the dimension of a holographic recording medium.

The shift multiplexing method uses the same principle as that of the angular multiplexing method. Therefore, as shown in FIG. 11, reconstruction positions are deviated from the corresponding recording positions (grooves) by a change in the dimension of a holographic recording medium. Thus, accessing data during reconstruction becomes complicated. In the shift multiplexing method, scanning (image capturing) can be performed while a holographic recording medium is being shifted. However, as distinct from the angular multiplexing method, the range where the angle of reference beam depends on the NA of a lens. Part of a hologram corresponding to a reference beam out of the angular range cannot be reconstructed.

In the shift multiplexing method, it is useful for reconstruction to change a wavelength. In other words, while a wavelength is being shifted so that the deviation between recording positions and reconstruction positions can be compensated for, an image may be reconstructed.

In the shift multiplexing method, when the difference in temperature between recording and reconstruction is large, an image cannot be reconstructed at once. In this case, the image is divided into segments and the segments are sequentially reconstructed using different reconstruction wavelengths, thus reconstructing the entire image.

FIGS. 12A and 12B are graphs showing the measurements of the diffraction efficiencies of a holographic recording medium where multiplex recording has been performed 11 times from a position of −125 μm with a pitch of 25 μm. FIG. 12A shows a reconstruction using the same wavelength as those during recording. FIG. 12B shows a reconstruction using a wavelength different from that during recording. As will be understood from those graphs, in the case where the wavelength is not shifted, reconstruction positions are deviated from recording positions. On the other hand, when the reconstruction wavelength is shifted from the recording wavelength by several nanometers, the recording positions are substantially identical to the reconstruction positions.

Application to Coaxial Holographic Method

Figure 13:
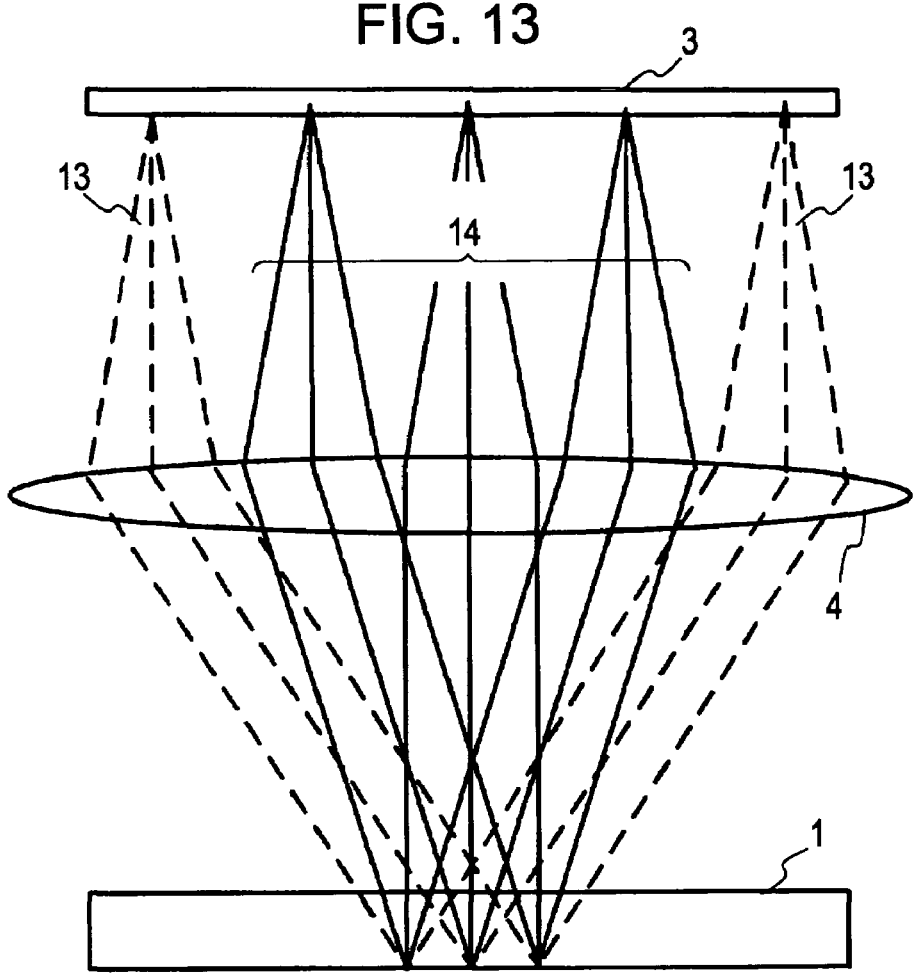
FIG. 13 is a diagram of the outline of the coaxial holographic method.
Figure 14:
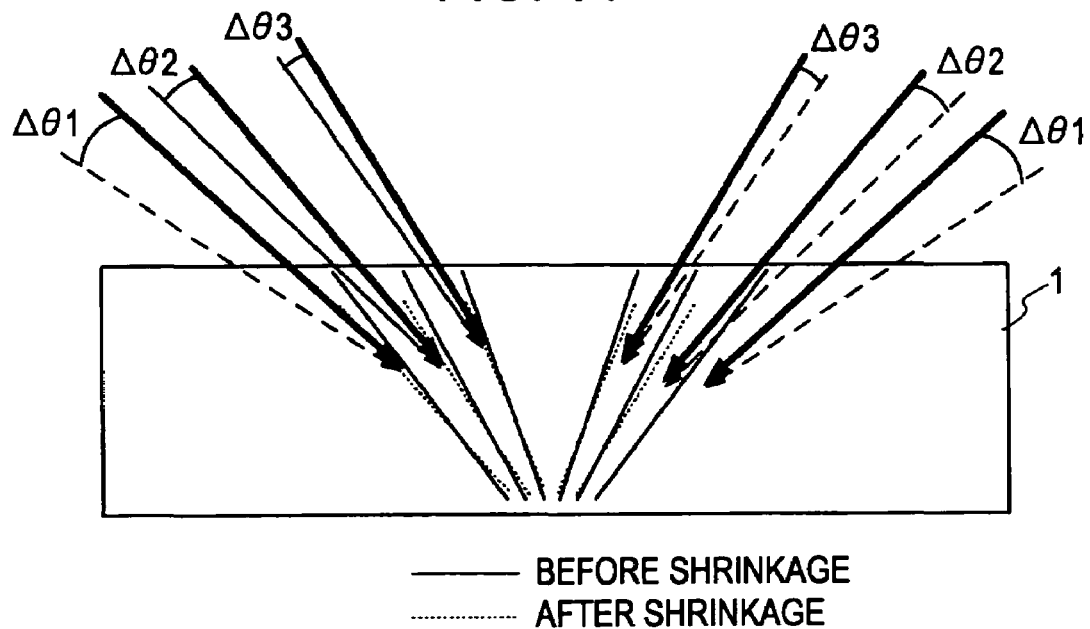
FIG. 14 is a diagram showing a change in diffraction grating angle when the dimension of a holographic recording medium is changed.

FIG. 13 is a diagram showing the outline of the coaxial holographic method. In the coaxial holographic method, the reference beam 13 is applied so as to surround the signal beam 14. In this instance, diffraction grating lines are radially arranged from the center of irradiation. Accordingly, when a change in the dimension of the medium, e.g., thermal expansion, occurs, the angles of the diffraction grating lines are changed as shown in FIG. 14. Regarding a hologram with a certain angle, when the reference beam 13 is laterally shifted, the incident angle of the reference beam 13 is changed. The direction of deviation of the incident angle in the right part of a reconstructed image is opposite to that in the left part thereof. In compensation by wavelength shifting, since a wavelength is shifted in the direction to cover the directions of angular deviations of the respective diffraction grating lines, an image can be simultaneously reconstructed.

Tunable Laser

Figure 15:
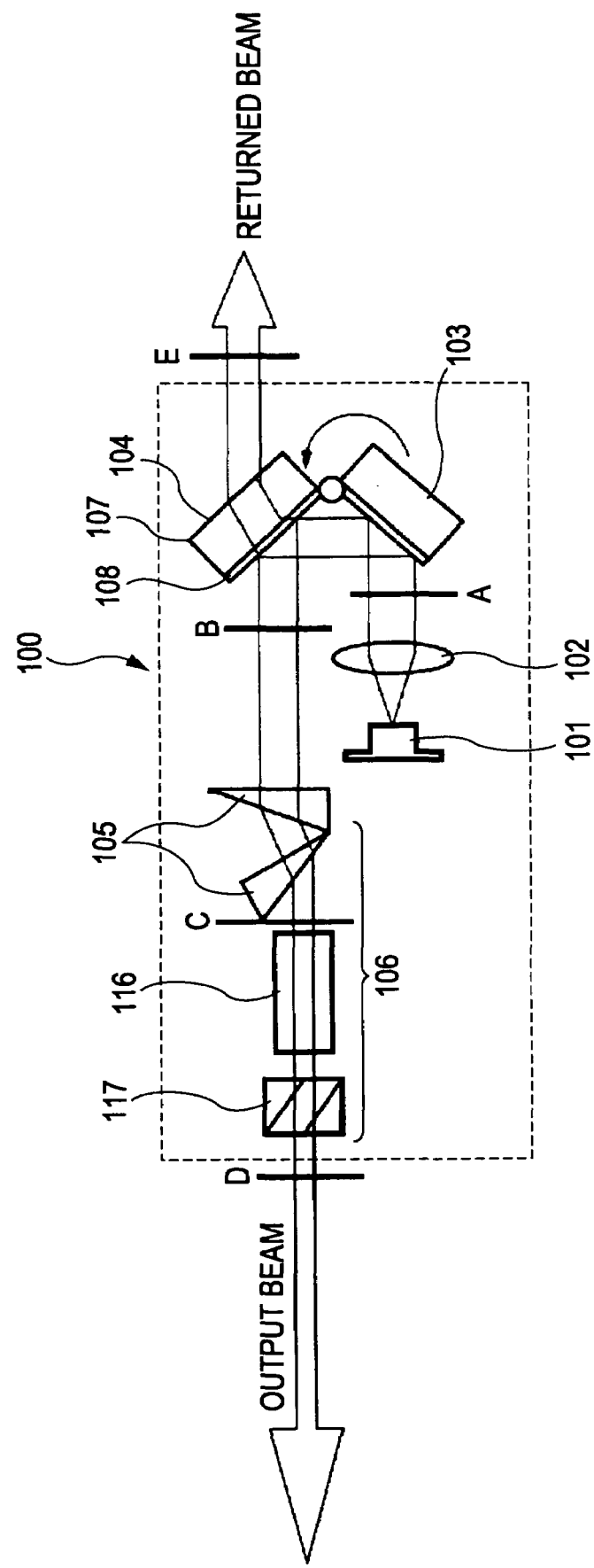
FIG. 15 is a diagram showing the structure of a tunable laser.

FIG. 15 is a diagram showing the structure of a tunable laser. Referring to FIG. 15, a tunable laser 100 includes a laser diode 101, a collimating lens 102, a diffraction grating 103, a polarizing beam splitter 104, an anamorphic prism pair 105, and an isolator 106.

The laser diode 101 emits a multi-mode laser beam, specifically, a blue laser beam having a wavelength of approximately 410 nm. The collimating lens 102 collimates the laser beam emitted from the laser diode 101 to a parallel beam. The diffraction grating 103 generates a first-order beam in the direction different every wavelength. The angle formed between the diffraction grating 103 and the laser diode 101 is set so that a first-order beam of a specific wavelength (of, e.g., 410 nm) is returned to the laser diode 101. Thus, only the specific wavelength component increases in the laser diode 101, resulting in a single mode. Most of laser beams emitted from the laser diode 101 are not first-order beams but zero-order beams that are reflected by the diffraction grating 103 acting like a mirror. In other words, fundamentally, the tunable laser 100 is a Littrow external cavity laser. The polarizing beam splitter 104 includes a transparent glass plate 107 and a polarizing film 108 provided on the surface of the transparent glass plate 107. The polarizing beam splitter 104, acting like a mirror, reflects a zero-order beam reflected by the diffraction grating 103 in a predetermined direction other than toward the diffraction grating 103 and transmits a polarized beam deviated from the polarization direction of the zero-order beam by 90°. The isolator 106 prevents the entry of external laser beams (reflected beams) and includes a rotator 116 and a polarizing beam splitter 117.

In the tunable laser 100 with the above-described structure, when the diffraction grating 103 is rotated, the wavelength of the blue laser beam, approximately 410 nm, can be changed by, e.g., 5 to 10 nm.

A tunable laser used in the embodiment according to the present invention is not limited to the above one. Other various types of tunable lasers are available.

Example of Angular Multiplexing Holographic Recording and Reconstructing Apparatus An example of an angular multiplexing holographic recording and reconstructing apparatus to which the present embodiment of the present invention is applied will now be described below.

Figure 16:
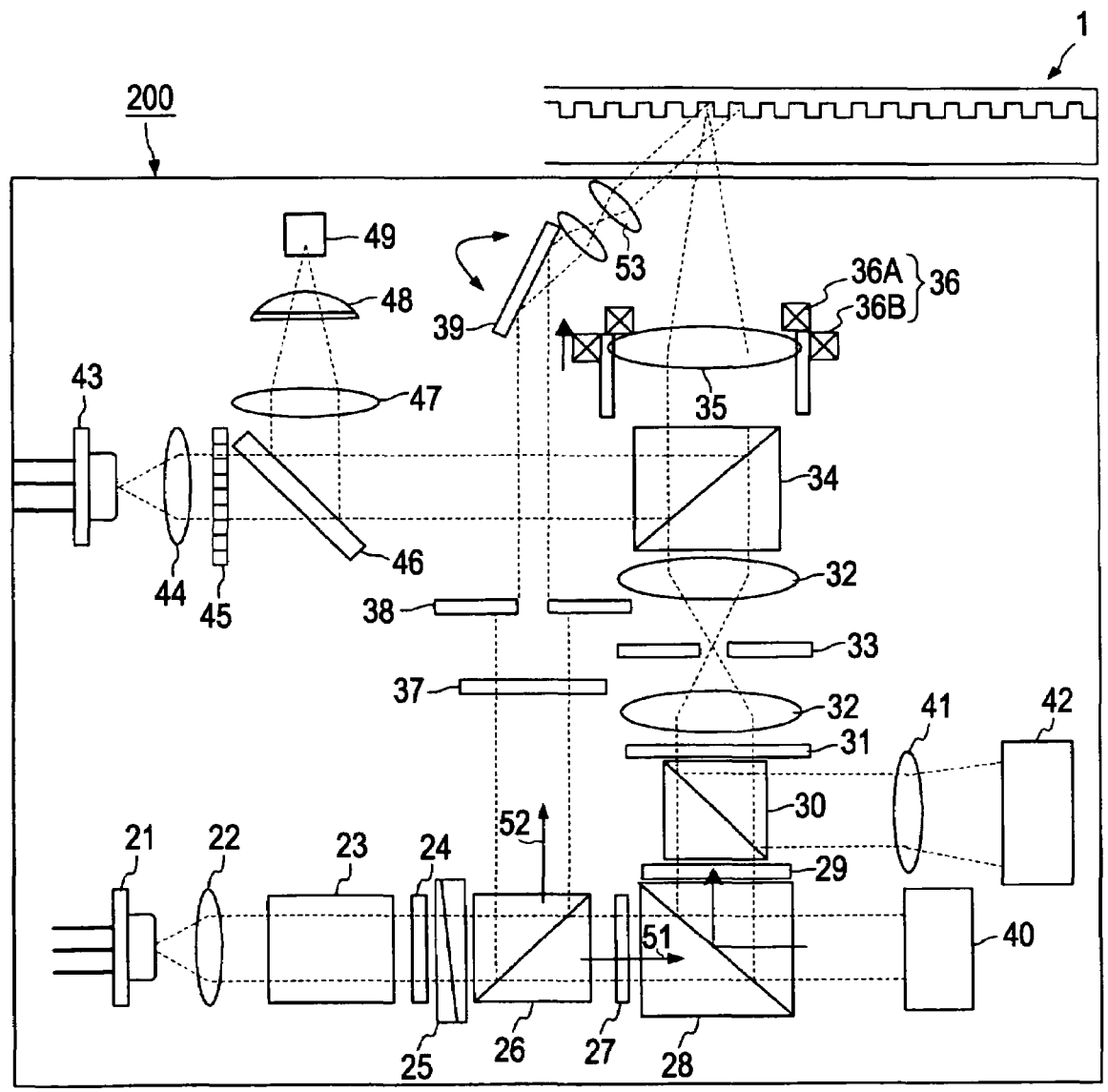
FIG. 16 is a diagram showing the structure of an optical unit of an angular multiplexing holographic recording and reconstructing apparatus.

FIG. 16 shows the structure of an optical unit of the angular multiplexing holographic recording and reconstructing apparatus.

In this holographic recording and reconstructing apparatus, an optical unit 200 includes a tunable laser 21, collimating lenses 22 and 44, an isolator 23, half wave plates 24, 27, 29, and 31, a mechanical shutter 25, polarizing beam splitters 26, 28, and 30, relay lens systems 32 and 53, a pin hole 33, a dichroic mirror 34, an objective lens 35, a servo driving unit 36, a half wave plate 37 for reference beam, a pin hole 38 for reference beam, a galvanometer mirror 39, a reflective liquid crystal device 40, a magnification control lens 41, a function CMOS sensor 42, a servo light source 43, a grating 45, a beam splitter 46, a converging lens 47, a cylindrical lens 48, and a photodetector 49.

The tunable laser 21 serves as a laser source capable of varying the wavelength of a beam. As a laser device, e.g., a laser diode (LD) having a wavelength of 405 nm or a Nd-YAG laser having a wavelength of 532 nm can be used.

The collimating lens 22 is an optical element for converting a laser beam emitted from the tunable laser 21 into a parallel beam.

The isolator 23 is an optical element for preventing the entry of a returned beam.

The half wave plate 24 is an optical element for controlling the ratio of p-polarized light to s-polarized light incident from the isolator 23.

The mechanical shutter 25 is an optical element for switching between beam ON and OFF modes. The polarizing beam splitter 26 is an optical element for splitting a beam into a p-polarized signal beam line 51 and an s-polarized reference beam line 52.

The half wave plate 27 is an optical element for controlling the intensity of a beam.

The polarizing beam splitter 28 is an optical element for allowing a p-polarized light component, which passes through the half wave plate 27, to be incident on the reflective liquid crystal device 40, serving as a spatial light modulator, and reflecting a beam reflected by the reflective liquid crystal device 40.

The half wave plate 29 is an optical element for converting a beam reflected by the polarizing beam splitter 28 into a p-polarized beam.

The polarizing beam splitter 30 is an optical element for transmitting a beam incident from the half wave plate 29 and reflecting a beam (reconstructed beam) returned from the half wave plate 31.

The half wave plate 31 is an optical element for transmitting a beam incident from the polarizing beam splitter 30 without change.

The relay lens system 32 is an optical element for transmitting a beam passing through the half wave plate 31 to the pin hole 33.

The pin hole 33 is an optical element for narrowing the diameter of a signal beam to cut high-order diffracted light from the liquid crystal device.

The dichroic mirror 34 is an optical element for allowing a beam for recording/reconstruction (i.e., a laser beam from the tunable laser 21) and a beam for servo (i.e., a laser beam from the servo light source 43) to pass along the same optical path. To cope with the fact that the tunable laser 21 emits a laser having a wavelength different from that of a laser beam from the servo light source 43, the dichroic mirror 34 transmits a recording/reconstruction beam emitted from the tunable laser 21 and reflects a servo beam emitted from the servo light source 43.

The objective lens 35 is an optical element for focusing both of a signal beam and a reference beam on the holographic recording medium 1.

The servo driving unit 36 is a driving mechanism for driving the objective lens 35 in two axial directions in response to a tracking error signal and a focus error signal output from the photodetector 49 to perform tracking control and focus control. The servo driving unit 36 includes coils 36A and 36B to drive the objective lens 35 in the respective axial directions.

The half wave plate 37 for reference beam is an optical element for converting a reference beam separated through the polarizing beam splitter 26 into a p-polarized beam.

The pin hole 38 for reference beam is an optical element for controlling the diameter of a reference beam, serving as a p-polarized beam converted through the half wave plate 37.

The galvanometer mirror 39 controls the incident angle of a reference beam on the holographic recording medium 1.

The reflective liquid crystal device 40 functions as a spatial light modulator for spatially (in this case, two-dimensionally) modulating a signal beam and superimposing data on the modulated beam. As the spatial light modulator, instead of the above-described reflective liquid crystal device, a digital micro mirror device (DMD) or a transmissive liquid crystal device may be used.

The magnification control lens 41 is an optical element for controlling the magnification of an incident reconstructed beam reflected from the polarizing beam splitter 30.

The function CMOS sensor 42 is a device capable of receiving an image formed by the reconstructed beam and designating an arbitrary address in the horizontal and vertical directions to read an image signal.

The servo light source 43 is a light source for servo control, such as tracking servo and focus servo, and emits a laser beam having a wavelength different from that of the tunable laser 21. The servo light source 43 includes, e.g., a laser diode that has an oscillation wavelength of, e.g., 650 nm to which the holographic recording medium 1 has a low sensitivity. The collimating lens 44 is an optical element for converting a laser beam emitted from the servo light source 43 into a parallel beam.

The grating 45 divides a laser beam emitted from the collimating lens 44 into three beams. The grating 45 includes two elements to divide a laser beam for servo control.

The beam splitter 46 is an optical element for transmitting a laser beam emitted from the grating 45 and reflecting a returned beam reflected by the holographic recording medium 1.

The converging lens 47 is an optical element for converging a returned beam reflected by the beam splitter 46 to focus the beam on the photodetector 49.

The cylindrical lens 48 transforms the circular shape of a laser beam emitted from the converging lens 47 into the elliptical shape.

The photodetector 49 receives a returned beam to output a tracking error signal for tracking servo control and a focus error signal for focus servo control. The photodetector 49 includes, e.g., a quadrant detector.

The holographic recording medium 1 is rotated by a spindle motor (not shown). Since the holographic recording medium 1 is moved, recording or reconstructing holograms onto/from the holographic recording medium 1 is performed along tracks formed in the moving direction.

The operation of the optical unit 200 will now be described.

The tunable laser 21 emits a laser beam and the collimating lens 22 converts the laser beam into a parallel beam. The isolator 23 transmits the beam in order to prevent the entry of returned light. After that, the half wave plate 24 controls the ratio of p-polarized light to s-polarized light. The polarizing beam splitter 26 divides the beam into a p-polarized signal beam line (signal beam) 51 and an s-polarized reference beam line (reference beam) 52.

The intensity of the signal beam is controlled by the half wave plate 27. Only the p-polarized component of the signal beam is transmitted through the polarizing beam splitter 28. Then, the transmitted beam is incident on the reflective liquid crystal device 40, serving as the spatial light modulator. Since the polarization is rotated by 90°, the beam modulated through the reflective liquid crystal device 40 is reflected by the polarizing beam splitter 28. The reflected beam is incident on the half wave plate 29, so that the beam is again converted into a p-polarized beam therethrough. The p-polarized beam is transmitted through the polarizing beam splitter 30 and is then incident on the half wave plate 31. Since the half wave plate 31 has such a rotation angle that the polarization direction is not changed, the incident p-polarized beam is transmitted through the half wave plate 31 without change. After that, the beam is transmitted through the relay lens system 32. In this instance, the pin hole 33 cuts high-order diffracted light from the liquid crystal device.

Subsequently, the signal beam is transmitted through the dichroic mirror 34. The transmitted signal beam is focused on the holographic recording medium 1 through the objective lens 35.

On the other hand, the reference beam emitted from the polarizing beam splitter 26 is converted into a p-polarized beam by the half wave plate 37. The diameter of the beam is adjusted through the pin hole 38. The beam is angle-modulated by the galvanometer mirror 39. The resultant beam is transmitted through the relay lens system 53. Then, the reference beam is incident on the holographic recording medium 1 so as to interfere with the signal beam applied at the same position. Consequently, an interference pattern is formed on the holographic recording medium 1. In this instance, information spatially modulated through the reflective liquid crystal device 40 is recorded as a hologram on the holographic recording medium 1.

In the case of using angular multiplexing, the angle of the galvanometer mirror 39 is changed, thus changing the incident angle of a reference beam on the holographic recording medium 1. Thus, recording with angular multiplexing can be achieved.

During reconstruction, the tunable laser 21 emits a beam having a wavelength shifted from the wavelength during recording. The amount of shift is determined in consideration of the shrinkage of the holographic recording medium 1 during recording or a change in the dimension of the holographic recording medium 1 caused by temperature change. In this instance, the signal beam is intercepted and only the reference beam is incident on the holographic recording medium 1 such that the incident angle of the reference beam is identical to that during recording. When the reference beam is incident with the same angle as that during recording, signals recorded on the holographic recording medium 1 can be read.

When the reference beam is incident on the holographic recording medium 1, a diffracted beam (reconstructed beam) is generated from a hologram recorded on the holographic recording medium 1. The reconstructed beam follows the reverse optical path of the signal beam, i.e., is transmitted through the objective lens 35, the dichroic mirror 34, and the relay lens system 32. When the reconstructed beam passes through the relay lens system 32, the pin hole 33 cuts noise in the beam. After that, the reconstructed beam is incident on the half wave plate 31. As distinct from recording, the half wave plate 31 rotates the polarization direction by 90° to convert the p-polarized beam into an s-polarized beam. The s-polarized beam is reflected by the polarizing beam splitter 30. The magnitude of the beam is controlled by the magnification control lens 41. The resultant beam is converted through the function CMOS sensor 42 into electric signals corresponding to spatial two-dimensional data compatible with the reflective liquid crystal device 40. The signals output from the function CMOS sensor 42 are binarized through a signal processing unit (not shown) to time-series data.

EXAMPLE OF COAXIAL HOLOGRAPHIC RECORDING AND REPRODUCING APPARATUS

An example of a coaxial holographic recording and reconstructing apparatus to which the present embodiment of the present invention is applied will now be described below.

Figure 17:
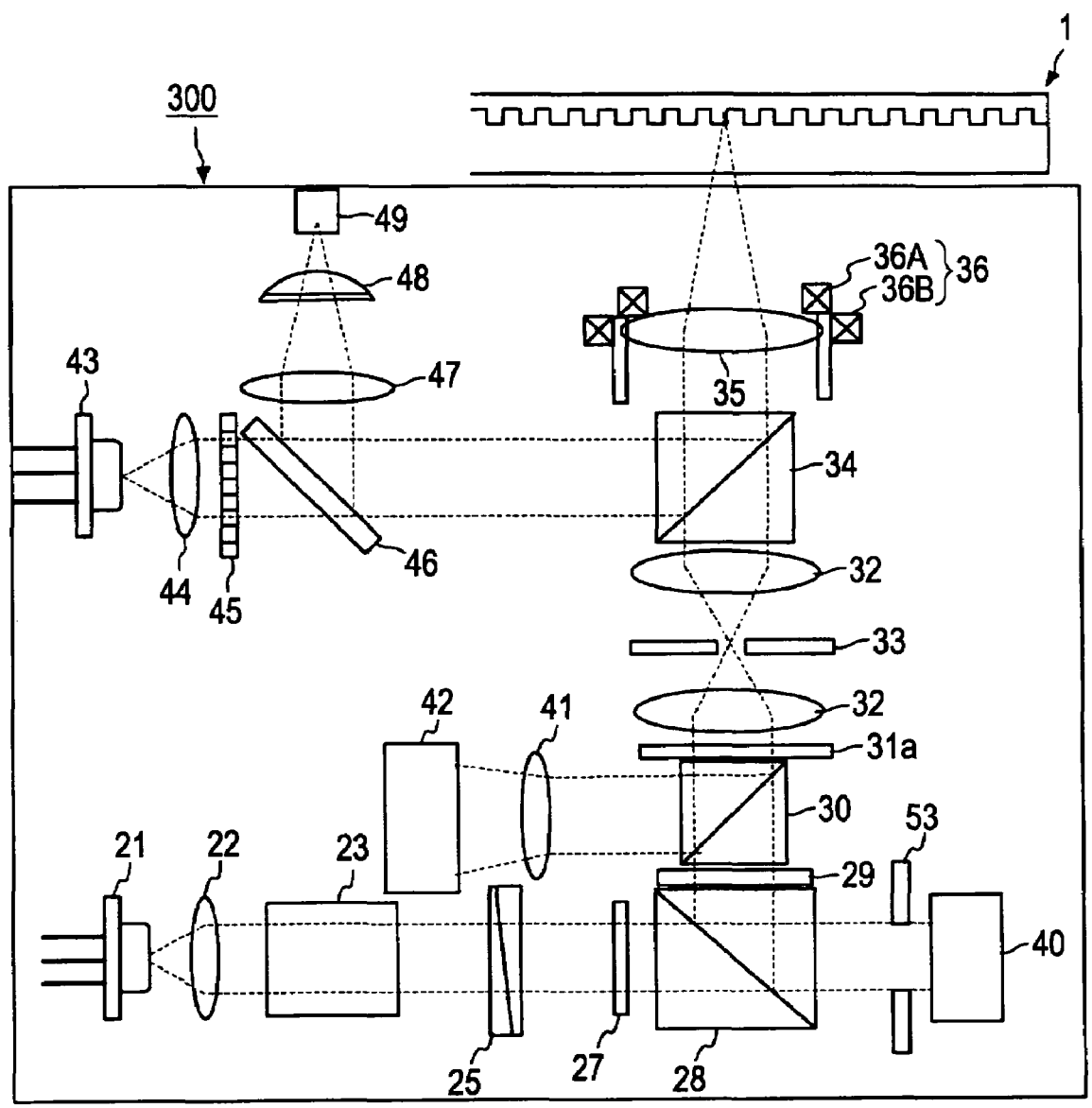
FIG. 17 is a diagram showing the structure of an optical unit of a coaxial holographic recording and reconstructing apparatus.

FIG. 17 shows the structure of an optical unit of the coaxial holographic recording and reconstructing apparatus.

Referring to FIG. 17, an optical unit 300 includes a tunable laser 21, collimating lenses 22 and 44, an isolator 23, a mechanical shutter 25, half wave plates 27 and 29, polarizing beam splitters 28 and 30, a quarter wave plate 31a, a relay lens system 32, pin holes 33 and 53, a dichroic mirror 34, an objective lens 35, a servo driving unit 36, a reflective liquid crystal device 40, a magnification control lens 41, a function CMOS sensor 42, a servo light source 43, a grating 45, a beam splitter 46, a converging lens 47, a cylindrical lens 48, and a photodetector 49. The same components as those in the foregoing example of the angular multiplexing holographic recording and reproducing apparatus are designated by the same reference numerals. An explanation of the previously described elements is omitted. Elements different from those of the foregoing example will be described below.

The quarter wave plate 31a is an optical element for converting a beam incident from the polarizing beam splitter 30 into a circularly polarized beam.

The objective lens 35 focuses a signal beam, a reference beam, and a beam for servo on a predetermined layer position in the holographic recording medium 1.

The servo light source 43 is a light source for servo control, such as tracking servo and focus servo, and emits a laser beam having a wavelength different from that of the tunable laser 21. A beam emitted from the servo light source 43 is also used as light to detect a diffracted beam. The servo light source 43 includes, e.g., a laser diode that has an oscillation wavelength that the holographic recording medium 1 has a low sensitivity to or is not sensible to, e.g., 633 nm.

The holographic recording medium 1 is rotated by a spindle motor (not shown). Since the holographic recording medium 1 is moved, recording or reconstruction onto/from the holographic recording medium 1 is performed along tracks formed in the moving direction.

The operation of the optical unit 300 of the coaxial holographic recording and reconstructing apparatus will now be described below.

The tunable laser 21 emits a laser beam and the collimating lens 22 converts the laser beam into a parallel beam. The isolator 23 transmits the beam in order to prevent the entry of returned light. After that, the half wave plate 27 controls the intensity of the beam. The polarizing beam splitter 28 transmits a p-polarized beam component alone. The resultant beam is incident on the reflective liquid crystal device 40, serving as a spatial light modulator.

In this instance, a pattern where the data area of a reference beam surrounds that of a signal beam is projected on the reflective liquid crystal device 40. According to the present example, a signal beam and a reference beam are transmitted along the same optical path. On the contrary, another pattern where the data area of a signal beam surrounds that of a reference beam may be formed. Alternatively, another pattern obtained by applying reference beams to both sides of a signal beam may be used.

Since the polarization of a beam modulated through the reflective liquid crystal device 40 is rotated by 90°, the modulated beam is reflected by the polarizing beam splitter 28. The reflected beam is incident on the half wave plate 29, so that the beam is again converted into a p-polarized beam therethrough. The p-polarized beam is transmitted through the polarizing beam splitter 30 and is then incident on the quarter wave plate 31a. The incident beam is converted into a circularly polarized beam by the quarter wave plate 31a. After that, the beam is transmitted through the relay lens system 32. In this instance, the pin hole 33 cuts high-order diffracted light from the liquid crystal device.

Subsequently, the beam is transmitted through the dichroic mirror 34. The transmitted beam is focused on the holographic recording medium 1 through the objective lens 35. Consequently, an interference pattern is formed on the holographic recording medium 1. In this instance, information spatially modulated through the reflective liquid crystal device 40 is recorded as a hologram on the holographic recording medium 1.

In this instance, the intensity of a reference beam pattern is modulated to a predetermined value. This pattern generates a speckle pattern in the holographic recording medium 1. A reconstructed beam is generated from only a portion where the speckle pattern coincides with the corresponding recorded speckle pattern. Thus, multiplexed recording can be achieved with a very fine shift pitch depending on the speckle size.

During reconstruction, the tunable laser 21 emits a beam with a wavelength shifted from the wavelength during recording. The amount of shift is determined in consideration of the shrinkage of the holographic recording medium 1 during recording or a change in the dimension of the holographic recording medium 1 caused by temperature change. In this instance, a pattern alone corresponding to a reference beam is displayed on the reflective liquid crystal device 40 and only the reference beam component is incident on the holographic recording medium 1. Thus, a diffracted beam (reconstructed beam) is generated from a hologram recorded on the holographic recording medium 1. The reconstructed beam follows the reverse optical path of the signal beam, i.e., the reconstructed beam is transmitted through the objective lens 35, the dichroic mirror 34, and the relay lens system 32. When the reconstructed beam passes through the relay lens system 32, the pin hole 33 cuts noise in the beam. After that, the reconstructed beam is converted into an s-polarized beam through the quarter wave plate 31a. The s-polarized beam is reflected by the polarizing beam splitter 30. The magnitude of the beam is controlled by the magnification control lens 41. The resultant beam is converted through the function CMOS sensor 42 into electric signals corresponding to spatial two-dimensional data compatible with the reflective liquid crystal device 40. The signals output from the function CMOS sensor 42 are binarized through a signal processing unit (not shown) to time-series data.

On the other hand, a beam emitted from the servo light source 43 is converted into a parallel beam through the collimating lens 44. The parallel beam is divided into three beams through the grating 45. A beam emitted from the grating 45 is transmitted through the beam splitter 46 and is then incident on the dichroic mirror 34. In the dichroic mirror 34, the reference beam is brought on the same optical path as that of a beam for recording/reconstruction. The beams are incident on the holographic recording medium 1 through the objective lens 35.

A control system compatible with the above-described angular multiplexing and coaxial holographic recording and reconstructing apparatuses will now be described below.

Figure 18:
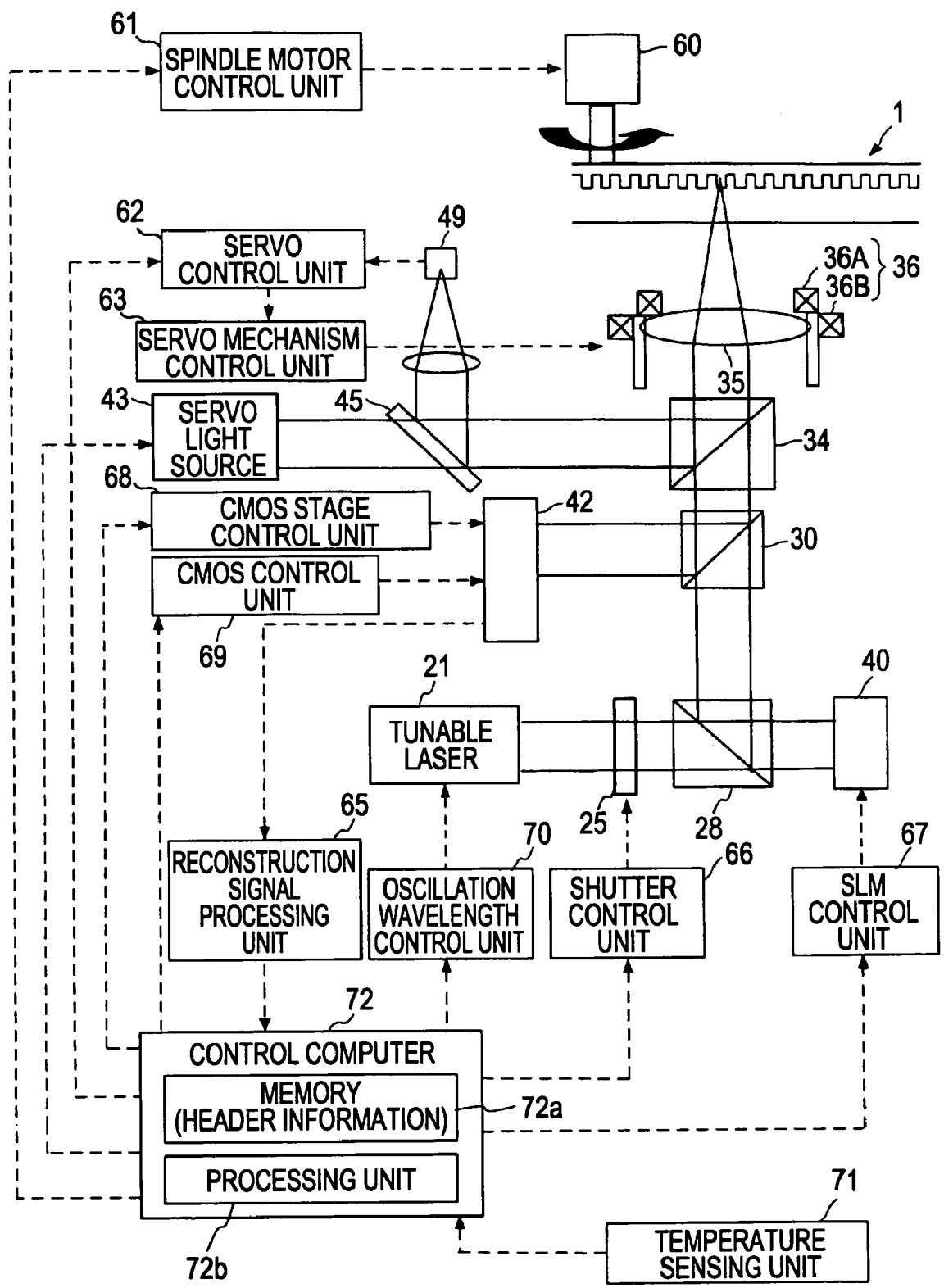
FIG. 18 is a diagram showing the structure of a control system compatible with the angular-multiplexing and coaxial holographic recording and reconstructing apparatuses.

FIG. 18 shows the structure of an electrical control system for the holographic recording and reconstructing apparatus.

Referring to FIG. 18, the holographic recording and reconstructing apparatus includes a spindle motor 60, a spindle motor control unit 61, a servo control unit 62, a servo mechanism control unit 63, a reconstruction signal processing unit 65, a shutter control unit 66, an SLM control unit 67, a CMOS stage control unit 68, a CMOS control unit 69, an oscillation wavelength control unit 70, a temperature sensing unit 71, and a control computer 72. The spindle motor 60 drives the holographic recording medium 1. The spindle motor control unit 61 controls the spindle motor 60. The servo control unit 62 performs arithmetic processing for tracking servo and focus servo based on outputs of the photodetector 49. The servo mechanism control unit 63 controls the servo driving unit 36 on the basis of a control signal output from the servo control unit 62. The reconstruction signal processing unit 65 processes reconstruction signals obtained through the function CMOS sensor 42 from a reconstructed beam. The shutter control unit 66 controls the open-close cycle of the mechanical shutter 25, i.e., drives the mechanical shutter 25. The SLM control unit 67 controls the reflective liquid crystal device 40. The CMOS stage control unit 68 controls the position of the function CMOS sensor 42 in the horizontal and vertical directions with respect to the direction of incidence of light. The CMOS control unit 69 controls the image reading operation of the function CMOS sensor 42. The oscillation wavelength control unit 70 controls the oscillation wavelength of the tunable laser 21. The temperature sensing unit 71 senses temperature. The control computer 72 controls the whole holographic recording and reconstructing apparatus.

The control computer 72 includes a processing unit 72a for controlling the above-described components and performing various arithmetic operations and a memory 72b for temporarily storing operation results obtained by the processing unit 72a.

The control operation during recording and that during reconstruction will now be described below.

Figure 19:
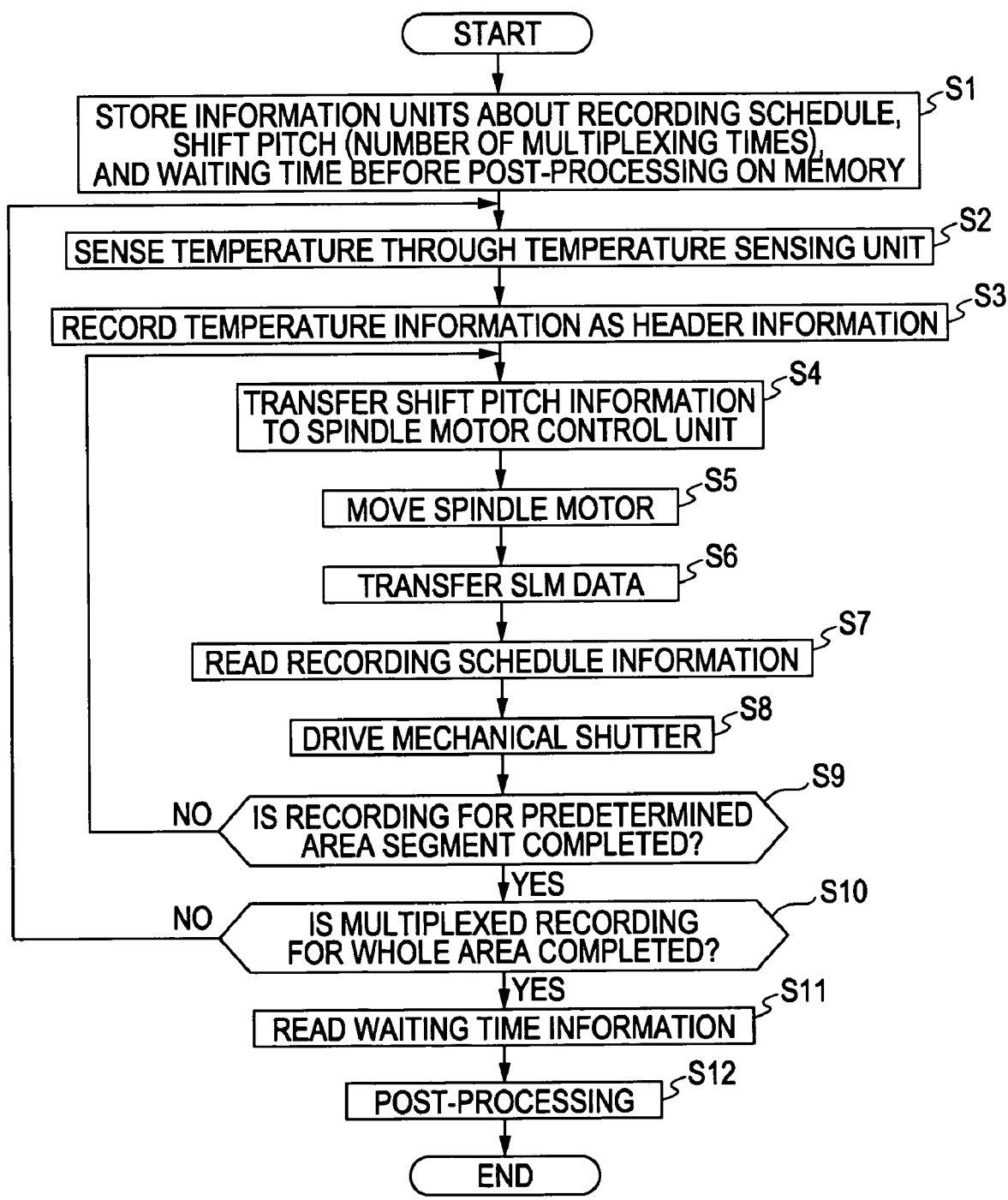
FIG. 19 is a flowchart of the operation of the control system of FIG. 18 during recording.

FIG. 19 is a flowchart of the control operation during recording.

The control computer 72 obtains information about recording schedule (hereinbelow, referred to as recording schedule information), information about a shift pitch, i.e., the number of multiplexing times (hereinafter, referred to as shift pitch information), and information about waiting time before post-processing (hereinbelow, referred to waiting time information) through the processing unit 72*a* and stores the information units on the memory 72*b* (step S1). Optimum values of various conditions for holographic recording may be obtained as follows. The conditions of the holographic recording medium 1, e.g., the diffraction efficiency of the holographic recording medium 1, the index of refraction modulation, the rise time of diffraction, the monomer diffusion rate, and the dynamic range of the holographic recording medium 1, are detected and the optimum values are obtained based on the detected conditions. Alternatively, the previously calculated and stored optimum values may be read.

The control computer 72 allows the temperature sensing unit 71 to sense temperature to obtain information about temperature (hereinbelow, referred to as temperature information) (step S2).

The control computer 72 binarizes the temperature information and transfers the resultant data to the SLM control unit 67 so that the obtained temperature information is recorded as header information on the holographic recording medium 1 (step S3).

The control computer 72 transfers the shift pitch information stored in the memory 72*b* to the spindle motor control unit 61 (step S4).

The spindle motor control unit 61 rotates the spindle motor 60 on the basis of the shift pitch information. Thus, a position to be irradiated with a signal beam and a reference beam is set to an initial recording position (step S5).

After that, the control computer 72 transfers SLM data to the SLM control unit 67 to display a two-dimensionally developed pattern based on time-series information for recording on the reflective liquid crystal device 40 (step S6).

The control computer 72 reads the time schedule information from the memory 72*b* (step S7) and outputs a control signal to the shutter control unit 66 so that the shutter control unit 66 controls the open-close cycle of the mechanical shutter 25, i.e., drives the mechanical shutter 25 in accordance with the recording schedule (step S8). Thus, information is actually recorded as a hologram on the holographic recording medium 1.

Subsequently, the control computer 72 determines whether recording for a predetermined area segment, where the temperature of the holographic recording medium 1 is sensed, is completed (step S9). In this instance, a predetermined area segment means a section obtained by dividing the entire area of the holographic recording medium 1.

If the recording for the predetermined area segment is not completed, the operation is returned to step S4 and the next recording is performed.

If the recording for the predetermined area segment is completed, the control computer 72 determines whether multiplexed recording for the whole area of the holographic recording medium 1 is completed (step S10). If NO, the operation is returned to step S2. Temperature is sensed and recording for the next predetermined area segment is performed.

If multiplexed recording for the whole area is completed, the control computer 72 reads the waiting time information from the memory 72*b* (step S11). After the lapse of the waiting time from the completion of the last recording, the control computer 72 performs post-processing, i.e., applies incoherent light to the entire holographic recording medium 1 (step S12). In a photopolymer holographic recording medium, any unpolymerized monomer left after recording is polymerized by irradiation with a reference beam for reconstruction, thus resulting in additional recording. This leads to a decrease in signal-to-noise ratio. To polymerize any unpolymerized monomer, therefore, incoherent light is applied to the entire holographic recording medium in post-processing.

Figure 20:
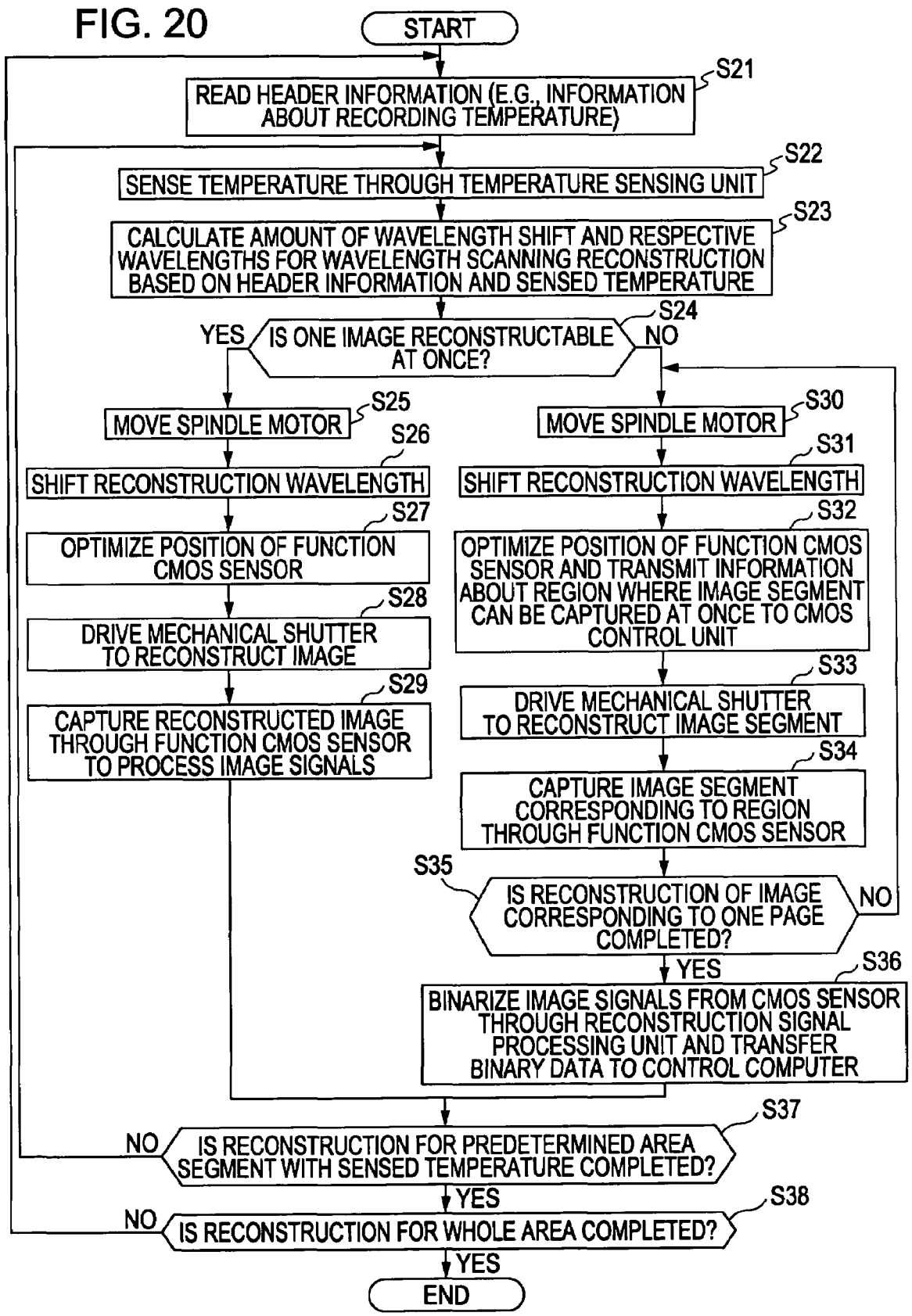
FIG. 20 is a flowchart of the operation of the control system of FIG. 18 during reconstruction.

FIG. 20 is a flowchart of the control operation during reconstruction.

During holographic reconstruction, the control computer 72 first reads temperature information included in header information from the holographic recording medium 1 (step S21). It is assumed that the whole area of the holographic recording medium 1 is divided into a plurality of sections and header information is recorded every section.

The control computer 72 allows the temperature sensing unit 71 to sense temperature, thus obtaining temperature information (step S22).

The control computer 72 compares the temperature information (i.e., temperature during recording) obtained from the header information with the temperature information (i.e., temperature during reconstruction) obtained through the temperature sensing unit 71 and calculates the amount of shift from the recording wavelength and respective wavelengths for wavelength scanning reconstruction on the basis of the difference in temperature between recording and reconstruction (hereinafter, the temperature difference) (step S23). When the header information includes information about the thermal expansion coefficient of the holographic recording medium 1 with respect to temperature, the amount of wavelength shift and the respective wavelengths for wavelength scanning reconstruction can be more accurately calculated using the thermal expansion coefficient. Subsequently, the control computer 72 determines whether one image can be reconstructed at once (step S24). The determination is made as follows. For example, a threshold value of the temperature difference is set. When the obtained temperature difference is below the threshold value, it is determined that one image can be reconstructed at once. If the obtained temperature difference is higher than the threshold value, it is determined that one image cannot be reconstructed at once.

The case where one image can be reconstructed at once will now be described.

In this case, the control computer 72 controls the spindle motor 60 through the spindle motor control unit 61 to rotate the holographic recording medium 1 so that a target reconstruction position corresponds to a position irradiated with a reference beam (step S25). Subsequently, the control computer 72 transmits information (hereinafter, wavelength information) about wavelengths, each of which is shifted from a default value or the current reconstruction wavelength by the shift amount calculated in step S23, to the oscillation wavelength control unit 70. The oscillation wavelength control unit 70 changes the oscillation wavelength of the tunable laser 21 on the basis of the above-mentioned wavelength information (step S26). The control computer 72 transmits control information based on the wavelength information to the CMOS stage control unit 68 so that the position of the function CMOS sensor 42 is optimized. The CMOS stage control unit 68 shifts a stage which mounts the function CMOS sensor 42 on the basis of the control information (step S27). Since the changing of the reconstruction wavelength leads to the displacement of a reconstructed image, the stage is shifted in order to correct the displacement. The stage is a mechanism for mounting the function CMOS sensor 42 such that the sensor 42 is movable in two or three axial directions.

The control computer 72 transmits control information to the shutter control unit 66 in accordance with the recording schedule to drive the mechanical shutter 25, thus applying a reference beam to the holographic recording medium 1 to reconstruct a hologram (image) (step S28). Subsequently, the control computer 72 transmits control information to the CMOS control unit 69 to capture the reconstructed image through the function CMOS sensor 42. The reconstructed image captured through the function CMOS sensor 42 is binarized to time-series data by the reconstruction signal processing unit 65. The binary time-series data is transferred to the control computer 72 (step S29).

On the other hand, when one image cannot be reconstructed at once, wavelength scanning reconstruction is performed. In this case, the control computer 72 controls the spindle motor 60 through the spindle motor control unit 61 to rotate the holographic recording medium 1 so that a target reconstruction position corresponds to a position irradiated with a reference beam (step S30). After that, the control computer 72 transmits information (hereinafter, wavelength information) about a first wavelength for wavelength scanning reconstruction to the oscillation wavelength control unit 70, the first wavelength being calculated in step S23 on the basis of the default value or the current reconstruction wavelength.

The oscillation wavelength control unit 70 shifts the oscillation wavelength of the tunable laser 21 on the basis of the above-described wavelength information (step S31). The control computer 72 transmits control information based on the wavelength information to the CMOS stage control unit 68 so that the position of the function CMOS sensor 42 is optimized. The CMOS stage control unit 68 shifts the stage mounting the function CMOS sensor 42 on the basis of the control information. In addition, the control computer 72 transmits information (region information) about a region where an image segment can be captured at once to the CMOS control unit 69 (step S32). The region information concerns the position and size of a region where an image segment can be captured at once. The region information is calculated on the basis of, e.g., the difference in temperature between recording and reconstruction. Alternatively, the region information can be calculated on the basis of the temperature difference and the thermal expansion coefficient of the holographic recording medium 1 obtained from the header information recorded thereon. After that, the control computer 72 transmits control information to the shutter control unit 66 in accordance with the recording schedule to drive the mechanical shutter 25, thus applying a reference beam to the holographic recording medium 1 to reconstruct a holographic image segment (step S33).

Subsequently, the control computer 72 transmits control information to the CMOS control unit 69 to capture a reconstructed holographic image segment which can be captured at once (step S34). After that, the control computer 72 determines whether the reconstruction of an image corresponding to one page is completed (step S35). If NO, the operation is returned to step S30. In this instance, after the holographic recording medium 1 is rotated so that the next target reconstruction position is set in a position irradiated with the reference beam, the reconstruction wavelength is shifted to the next wavelength for wavelength scanning reconstruction, a holographic image segment corresponding to the next region is reconstructed using the shifted wavelength, and the image segment is captured in a manner similar to the above. In this manner, the whole image is captured using respective wavelengths for wavelength scanning reconstruction.

When the reconstruction of the one-page image is finished, the control computer 72 transmits control information to the CMOS control unit 69 to obtain signals corresponding to the reconstructed image from the function CMOS sensor 42. The reconstructed image signals obtained from the function CMOS sensor 42 are converted into binary time-series data through the reconstruction signal processing unit 65. The binary time-series data is transferred to the control computer 72 (step S36).

After receiving image data of one page, the control computer 72 determines whether the reconstruction of all image segments in the current section (predetermined area segment) is finished (step S37). If NO, the operation is returned to step S22. Temperature information is obtained from the temperature sensing unit 71, the amount of shift and respective wavelengths for wavelength scanning reconstruction are calculated, and image segments corresponding to the next page are reconstructed in a manner similar to the above. If the reconstruction of all image segments in the current section is completed, the control computer 72 determines whether the reconstruction for all sections (i.e., the whole area) is completed (step S38). If NO, the process is returned to step S21. Header information is obtained from the next section and the reconstruction for the next section is similarly performed. The above-described steps are repeated until the reconstruction for all sections is completed.

In step S23, the amount of shift from the default value or the current reconstruction wavelength and respective wavelengths for wavelength scanning reconstruction are calculated on the basis of the temperature difference between recording and reconstruction. When the temperature difference is lower than a predetermined value (i.e., the thermal expansion of the holographic recording medium 1 is enough small not to affect reconstruction), each wavelength is shifted so as to compensate for the shrinkage on polymerization of the medium during recording.

It should be understood by those skilled in the art that various modifications, combinations, sub-combinations and alterations may occur depending on design requirements and other factors insofar as they are within the scope of the appended claims or the equivalents thereof.

The invention claimed is:

1. A holographic recording and reconstructing apparatus, comprising:
   a light source having a variable oscillation wavelength;
   temperature sensing means for sensing temperature; and
   control means for controlling (1) recording onto a holographic recording medium a recording temperature which is sensed by the temperature sensing means, the recording temperature being sensed during recording of data onto the medium, (2) obtaining from the holographic recording medium the recording temperature, the recording temperature being obtained during reconstruction of the data recorded onto the medium, (3) obtaining a reconstruction temperature which is sensed by the temperature sensing means during reconstruction, (4) determining an amount of wavelength shift necessary to counteract the effects of a change in a dimension of the holographic recording medium which occurs between the time at which the recording temperature is sensed and the time at which the reconstruction temperature is sensed, the amount being determined based on the difference between the recording temperature and the reconstruction temperature, and (5) shifting the oscillation wavelength of the light source by the determined amount.

2. The apparatus according to claim 1, wherein the control means obtains information about the thermal expansion coefficient of the holographic recording medium to calculate the amount of wavelength shift using the thermal expansion coefficient, the information being previously recorded on the holographic recording medium.

3. The apparatus according to claim 1, wherein when the difference between the recording temperature and the reconstruction temperature is below a threshold value, the control means obtains the amount of wavelength shift in consideration of the shrinkage of the holographic recording medium during recording to shift the oscillation wavelength of the light source by the determined amount.

4. The apparatus according to claim 3, wherein the control means obtains information about the shrinkage of the holographic recording medium during recording to calculate the amount of wavelength shift using the shrinkage of the holographic recording medium during recording, the information being previously recorded on the holographic recording medium.

5. The apparatus according to claim 1, wherein the control means obtains the amount of wavelength shift in consideration of the angle of incidence of a beam on the holographic recording medium.

6. The apparatus according to claim 1, wherein the control means divides the whole area of the holographic recording medium into sections, records information about temperature sensed by the temperature sensing means every section during recording, and determines the amount of wavelength shift every section during reconstruction.

7. The apparatus according to claim 1, wherein the control means divides the data into segments and controls so as to reconstruct the segments with different wavelengths.

8. The apparatus according to claim 7, wherein the control means obtains the number of segments and the wavelengths for the respective segments based on the difference between the temperatures.

9. The apparatus according to claim 1, further comprising:
a function CMOS sensor for receiving image signals corresponding to a reconstructed image to read the image signal in a designated address, wherein
when one image is divided into segments and the segments are reconstructed with different wavelengths, the control means controls the function CMOS sensor to read the image signals corresponding to each segment synchronously with a change in wavelength.

10. A holographic recording and reconstructing method, comprising the steps of:
recording onto a holographic recording medium a recording temperature which is sensed by a temperature sensing means, the recording temperature being sensed during recording of data onto the medium;
obtaining from the holographic recording medium the recording temperature, the recording temperature being obtained during reconstruction of the data recorded onto the medium;
obtaining a reconstruction temperature which is sensed by the temperature sensing means during reconstruction; and
determining an amount of wavelength shift necessary to counteract the effects of a change in a dimension of the holographic recording medium which occurs between the time at which the recording temperature is sensed and the time at which the reconstruction temperature is sensed, the amount being determined based on the difference between the recording temperature and the reconstruction temperature.

11. A holographic recording and reconstructing apparatus, comprising:
a light source having a variable oscillation wavelength;
a temperature sensing unit operable to sense temperature; and
a control unit operable to control (1) recording onto a holographic recording medium a recording temperature which is sensed by the temperature sensing means, the recording temperature being sensed during recording of data onto the medium, (2) obtaining from the holographic recording medium the recording temperature, the recording temperature being obtained during reconstruction of the data recorded onto the medium, (3) obtaining a reconstruction temperature which is sensed by the temperature sensing means during reconstruction, (4) determining an amount of wavelength shift necessary to counteract the effects of a change in a dimension of the holographic recording medium which occurs between the time at which the recording temperature is sensed and the time at which the reconstruction temperature is sensed, the amount being determined based on the difference between the recording temperature and the reconstruction temperature, and (5) shifting the oscillation wavelength of the light source by the determined amount.

* * * * *